(12) United States Patent
Hironaka et al.

(10) Patent No.: US 12,038,001 B2
(45) Date of Patent: Jul. 16, 2024

(54) WORKING FLUID SUPPLY SYSTEM

(71) Applicant: KYB Corporation, Tokyo (JP)

(72) Inventors: Tsuyoshi Hironaka, Tokyo (JP); Midori Nagashima, Tokyo (JP); Ken Tsukui, Tokyo (JP); Kazuya Murota, Tokyo (JP)

(73) Assignee: KYB CORPORATION, Tokyo (JP)

( * ) Notice: Subject to any disclaimer, the term of this patent is extended or adjusted under 35 U.S.C. 154(b) by 44 days.

(21) Appl. No.: 17/755,763

(22) PCT Filed: Oct. 13, 2020

(86) PCT No.: PCT/JP2020/038594
§ 371 (c)(1),
(2) Date: May 6, 2022

(87) PCT Pub. No.: WO2021/090646
PCT Pub. Date: May 14, 2021

(65) Prior Publication Data
US 2022/0389944 A1   Dec. 8, 2022

(30) Foreign Application Priority Data
Nov. 8, 2019   (JP) .................................. 2019-203015

(51) Int. Cl.
*F04C 14/02*   (2006.01)
*F16H 57/04*   (2010.01)
(Continued)

(52) U.S. Cl.
CPC ......... *F04C 14/02* (2013.01); *F16H 57/0439* (2013.01); *F15B 13/00* (2013.01);
(Continued)

(58) Field of Classification Search
CPC .... F15B 21/001; F15B 13/00; F16H 57/0439; F16H 57/0441; F16H 57/0435; F16H 57/0412; F16H 57/0436; F04C 14/02
See application file for complete search history.

(56) References Cited

U.S. PATENT DOCUMENTS 5,284,119 A  *  2/1994  Smitley ............. F02M 37/0052
                                                                123/506
6,196,806 B1 *  3/2001  Van Der Sluis .. F16H 61/66272
                                                                417/295
(Continued)

FOREIGN PATENT DOCUMENTS

JP   H10-266978 A    10/1998
JP   2015-197212 A   11/2015

*Primary Examiner* — Dustin T Nguyen
(74) *Attorney, Agent, or Firm* — Rabin & Berdo, P.C.

(57) ABSTRACT

A working-fluid supply system includes: a first pump and a second pump driven by an engine; a first switching valve capable of switching a supply target of the second pump to either one of the discharge side and the suction side of the first pump; a first switching control unit configured to perform a switching control of the first switching valve; and a first pressure control unit configured to perform a control such that pressure on the suction side of the first pump becomes a predetermined first pressure when the first switching valve is switched such that the supply target of the second pump becomes the suction side of the first pump.

2 Claims, 10 Drawing Sheets

(51) Int. Cl.
 *F15B 13/00* (2006.01)
 *F15B 21/00* (2006.01)
 *F16H 61/00* (2006.01)

(52) U.S. Cl.
 CPC ........ *F15B 21/001* (2013.01); *F16H 57/0435* (2013.01); *F16H 57/0441* (2013.01); *F16H 61/0031* (2013.01)

(56) References Cited

U.S. PATENT DOCUMENTS

| | | |
|---|---|---|
| 10,274,082 B2 * | 4/2019 | Van Der Sluis .... F16H 61/0031 |
| 10,371,139 B2 * | 8/2019 | Shibata ................... F04B 51/00 |
| 2009/0097986 A1 * | 4/2009 | Nakata .................. F04B 49/065 417/44.2 |
| 2009/0113888 A1 | 5/2009 | Kuttler et al. |
| 2015/0308570 A1 | 10/2015 | Van Der Sluis |
| 2016/0265520 A1 * | 9/2016 | Skinner, Jr. ........... F04B 49/065 |

\* cited by examiner

//WORKING FLUID SUPPLY SYSTEM

TECHNICAL FIELD

The present invention relates to a working-fluid supply system that supplies the working fluid to a fluid apparatus.

BACKGROUND ART

JPH10-266978A discloses a working-fluid supply system that is provided with a main pump and a sub-pump each capable of supplying working fluid to a fluid apparatus by being driven by output from a driving source. In this working-fluid supply system, the working fluid discharged from the sub-pump is returned to the suction side of the main pump, and thereby, generation of cavitation is suppressed and a pump efficiency is improved.

SUMMARY OF INVENTION

In the working-fluid supply system described in JPH10-266978A, as long as the working fluid is discharged from the sub-pump in excess amount, the working fluid discharged from the sub-pump is returned to the suction side of the main pump. Although an efficiency of the main pump is improved as the amount of the working fluid supplied from the sub-pump to the suction side of the main pump is increased, if the amount supplied from the sub-pump becomes excessive relative to an amount sucked into the main pump, the pressure at the suction side of the main pump, in other words, the pressure at the discharge side of the sub-pump is increased, and as a result, a driving load of the sub-pump is increased. As described above, when the driving load of the sub-pump is increased, even if the efficiency of the main pump is improved, there is a risk in that the efficiency of the working-fluid supply system may be deteriorated as a whole.

An object of the present invention is to improve an efficiency of a working-fluid supply system.

According to one aspect of the present invention, a working-fluid supply system configured to supply working fluid to a fluid apparatus includes: a first pump configured to be driven by output from a first driving source, the first pump being capable of supplying the working fluid to the fluid apparatus; a second pump configured to be driven by output from the first driving source or a second driving source different from the first driving source, the second pump being capable of supplying the working fluid to the fluid apparatus; a first switching valve capable of switching a supply target of the working fluid from the second pump to either one of a discharge side of the first pump and a suction side of the first pump; a first switching control unit configured to perform a switching control of the first switching valve in accordance with a required flow amount of the working fluid required by the fluid apparatus; and a first pressure control unit configured to perform a control such that pressure on the suction side of the first pump becomes a predetermined first pressure when the first switching valve is switched such that the supply target of the working fluid from the second pump becomes the suction side of the first pump.

DESCRIPTION OF EMBODIMENTS

Embodiments of the present invention will be described below with reference to the attached drawings.

First Embodiment

Figure 1:
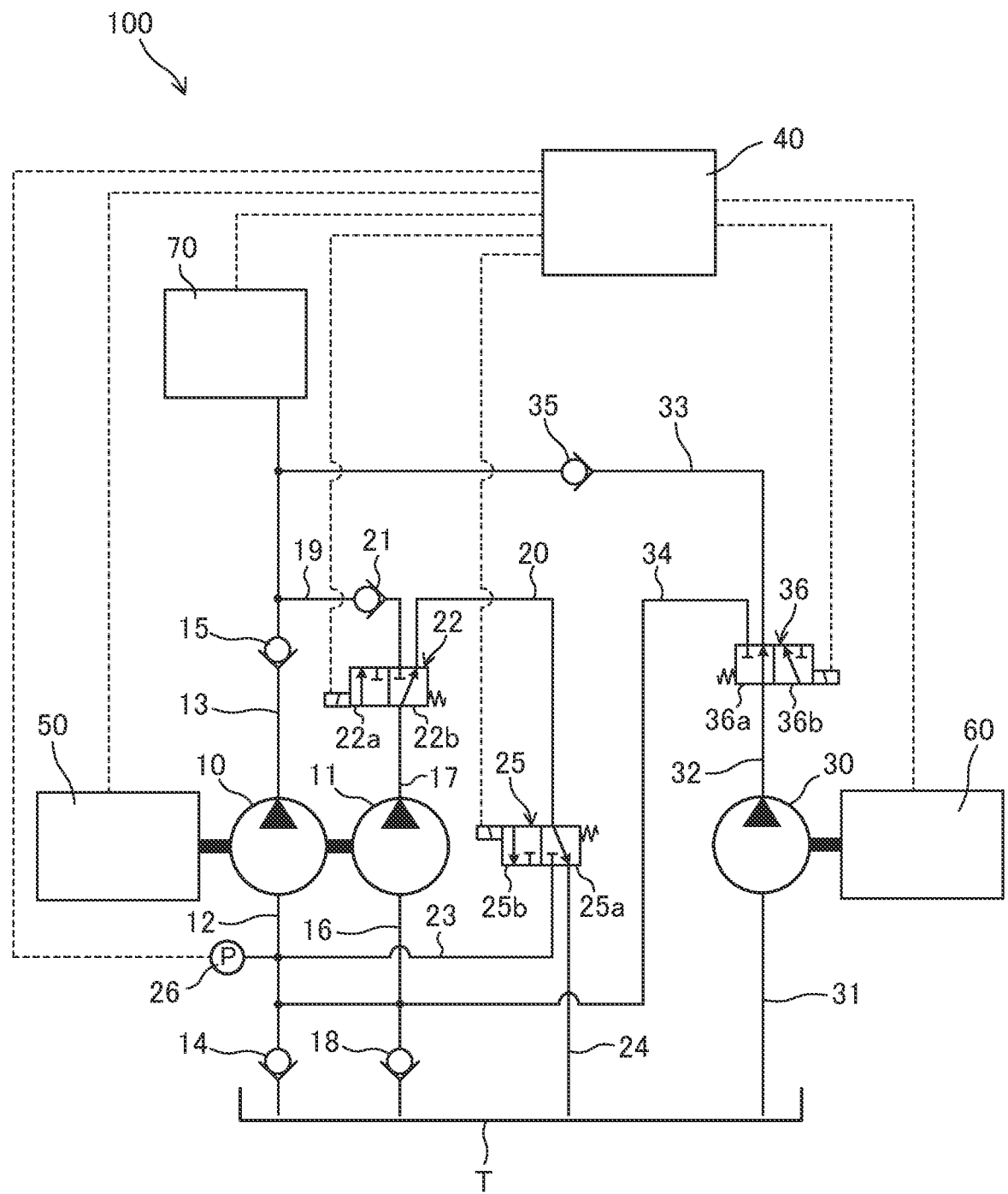
FIG. 1 is a schematic view showing a configuration of a working-fluid supply system according to a first embodiment of the present invention.

A working-fluid supply system 100 according to a first embodiment of the present invention will be described with reference to FIG. 1.

The working-fluid supply system 100 is a system for supplying working fluid to a fluid apparatus that is operated with the working fluid. In the following, description will be given of a case in which the working-fluid supply system 100 is mounted on a vehicle provided with an engine 50 and an automatic transmission 70 that transmits output from the engine 50 to a driving wheel and the working-fluid supply system 100 supplies the working fluid to the automatic transmission 70 serving as the fluid apparatus having a belt type continuously variable transmission (CVT). FIG. 1 is a schematic view showing the configuration of the working-fluid supply system 100.

The working-fluid supply system 100 is provided with: a first oil pump 10 serving as a first pump that is driven by the output from the engine 50 serving as a first driving source and that is capable of supplying working oil serving as the working fluid to the automatic transmission 70; a second oil pump 11 serving as a second pump that is, together with the first oil pump 10, driven by the output from the engine 50 and that is capable of supplying the working oil to the automatic transmission 70; a third oil pump 30 serving as a third pump that is driven by output from an electric motor 60 serving as a second driving source different from the engine 50 and that is capable of supplying the working oil to the automatic transmission 70; a first switching valve 22 that is capable of switching a supply target of the working oil from the second oil pump 11 to either one of the discharge side of the first oil pump 10 and the suction side of the first oil pump 10; a third switching valve 36 that is capable of switching the supply target of the working oil from the third oil pump 30 to either one of the discharge side of the first oil pump 10 and the suction side of the first oil pump 10; and a controller 40 that controls a supply state of the working oil to the automatic transmission 70 by controlling the operations of an electric motor 60, the first switching valve 22, and the third switching valve 36.

The first oil pump 10 is a vane pump that is rotationally driven by the engine 50, and the first oil pump 10 sucks the working oil stored in a tank T through a first suction pipe 12 and discharges the working oil to the automatic transmission 70 through a first discharge pipe 13. The first suction pipe 12 is provided with a check valve 14 that allows only a flow of the working oil from the tank T to the first oil pump 10.

Similarly to the first oil pump 10, the second oil pump 11 is the vane pump that is rotationally driven by the engine 50, and the second oil pump 11 sucks the working oil stored in the tank T through a second suction pipe 16 and discharges the working oil through a second discharge pipe 17. The second suction pipe 16 is provided with a check valve 18 that allows only a flow of the working oil from the tank T to the second oil pump 11.

The first oil pump 10 and the second oil pump 11 may be two vane pumps configured separately or may be configured as a single vane pump such as a balanced vane pump having two suction regions and two discharge regions. In addition, a discharge flow amount from the first oil pump 10 and a discharge flow amount from the second oil pump 11 may be the same or different.

The second discharge pipe 17 is connected to the first discharge pipe 13 via the first switching valve 22 and a first connecting pipe 19. The first connecting pipe 19 is provided with a check valve 21 that allows only a flow of the working oil from the second oil pump 11 to the automatic transmission 70. In addition, the first discharge pipe 13, to which the first connecting pipe 19 is connected, is provided with a check valve 15 that allows only a flow of the working oil from the first oil pump 10 to the automatic transmission 70 at the upstream side of a position where the first connecting pipe 19 is connected.

The first switching valve 22 is an electrically driven switching valve and has: two positions, i.e. a first position 22a at which the second discharge pipe 17 is communicated with the first connecting pipe 19 and a second position 22b at which the second discharge pipe 17 is communicated with a first returning flow passage 20 serving as a returning flow passage. Although the position of the first switching valve 22 is controlled by the controller 40, it is biased so as to be set at the second position 22b when electric current is not supplied.

The working-fluid supply system 100 is further provided with a second switching valve 25 at a second end of the first returning flow passage 20 whose first end is connected to the first switching valve 22.

Similarly to the first switching valve 22, the second switching valve 25 is the electrically driven switching valve, and the second switching valve 25 has two positions, i.e. a first position 25a at which the first returning flow passage 20 is communicated with a branch passage 24 and a second position 25b at which the first returning flow passage 20 is communicated with a second returning flow passage 23 serving as the returning flow passage. Although the position of the second switching valve 25 is controlled by the controller 40, it is biased so as to be set at the first position 25a when the electric current is not supplied.

The branch passage 24 is connected to the second switching valve 25 at a first end and is connected to the tank T at a second end. In addition, a first end of the second returning flow passage 23 is connected to the second switching valve 25, and a second end of the second returning flow passage 23 is connected to the part of the first suction pipe 12 on the downstream side of the check valve 14 on the suction side of the first oil pump 10.

In addition, a pressure sensor 26 that is capable of detecting suction pressure of the first oil pump 10 is provided at the part of the first suction pipe 12 on the downstream side of the check valve 14 on the suction side of the first oil pump 10. The detected value detected by the pressure sensor 26 is input to the controller 40.

In a state in which the first switching valve 22 having the above-described configuration is switched to the first position 22a, the second discharge pipe 17 is communicated with the first connecting pipe 19, and the communication between the second discharge pipe 17 and the first returning flow passage 20 is shut off. Thus, the working oil that has been discharged from the second oil pump 11 is supplied to the automatic transmission 70 through the first connecting pipe 19.

On the other hand, in a state in which the first switching valve 22 is switched to the second position 22b, the second discharge pipe 17 is communicated with the first returning flow passage 20, and the communication between the second discharge pipe 17 and the first connecting pipe 19 is shut off. At this state, when the position of the second switching valve 25 having the above-described configuration is set at the first position 25a, the first returning flow passage 20 is communicated with the branch passage 24. Thus, the working oil that has been discharged from the second oil pump 11 is discharged to the tank T through the first returning flow passage 20 and the branch passage 24.

On the other hand, at this state, when the position of the second switching valve 25 is set at the second position 25b, the first returning flow passage 20 is communicated with the second returning flow passage 23. Thus, the working oil that has been discharged from the second oil pump 11 is supplied to the suction side of the first oil pump 10 through the first returning flow passage 20 and the second returning flow passage 23.

In other words, when the position of the first switching valve 22 is set at the second position 22b and the position of the second switching valve 25 is set at the first position 25a, a state in which both of the suction side and the discharge side of the second oil pump 11 are communicated with the tank T is established, and difference between the pressure on the suction side and the pressure on the discharge side of the second oil pump 11 becomes substantially zero. Therefore, it is possible to achieve a no-load operation state of the second oil pump 11, in other words, a state in which the load for driving the second oil pump 11 is scarcely applied to the engine 50.

In addition, when the position of the first switching valve 22 is set at the second position 22b and the position of the second switching valve 25 is set at the second position 25b, a state in which the working oil that has been discharged from the second oil pump 11 is supplied to the suction side of the first oil pump 10 is established. Therefore, by suppressing excessive reduction of the pressure on the suction side of the first oil pump 10 to a negative pressure, it is possible to make it difficult for a cavitation to be caused. In addition, by increasing the pressure on the suction side of the first oil pump 10, it is possible to improve the pump efficiency of the first oil pump 10.

The third oil pump 30 is an internal gear pump that is rotationally driven by the electric motor 60, and the third oil pump 30 sucks the working oil stored in the tank T through a suction pipe 31 and discharges the working oil through third discharge pipe 32.

A third discharge pipe 32 is connected to the first discharge pipe 13 via the third switching valve 36 and a second connecting pipe 33. The second connecting pipe 33 is provided with a check valve 35 that allows only a flow of the working oil from the third oil pump 30 to the automatic transmission 70.

The third switching valve 36 is the electrically driven switching valve, and the third switching valve 36 has two positions, i.e. a first position 36a at which the third discharge pipe 32 is communicated with the second connecting pipe 33 and a second position 36b at which the third discharge pipe 32 is communicated with a third returning flow passage 34 serving as the returning flow passage. Although the position of the third switching valve 36 is controlled by the controller 40, it is biased so as to be set at the first position 36a when the electric current is not supplied.

A first end of the third returning flow passage 34 is connected to the third switching valve 36, and a second end of the third returning flow passage 34 is connected to the part of the first suction pipe 12 on the downstream side of the check valve 14 on the suction side of the first oil pump 10 and is connected to a part of the second suction pipe 16 on the downstream side of the check valve 18 on the suction side of the second oil pump 11.

In a state in which the third switching valve 36 having the above-described configuration is switched to the first position 36a, the third discharge pipe 32 is communicated with the second connecting pipe 33, and the communication between the third discharge pipe 32 and the third returning flow passage 34 is shut off. Thus, the working oil that has been discharged from the third oil pump 30 is supplied to the automatic transmission 70 through the second connecting pipe 33.

On the other hand, in a state in which the third switching valve 36 is switched to the second position 36b, the third discharge pipe 32 is communicated with the third returning flow passage 34, and the communication between the third discharge pipe 32 and the second connecting pipe 33 is shut off. Thus, the working oil that has been discharged from the third oil pump 30 is supplied to the suction sides of the first oil pump 10 and the second oil pump 11 through the third returning flow passage 34.

In other words, when the position of the third switching valve 36 is set at the second position 36b, a state in which the working oil that has been discharged from the third oil pump 30 is supplied to the suction sides of the first oil pump 10 and the second oil pump 11 is established. Therefore, by suppressing the excessive reduction of the pressures on the suction sides of the first oil pump 10 and the second oil pump 11 to the negative pressure, it is possible to make it difficult for the cavitation to be caused. In addition, by increasing the pressures on the suction sides of the first oil pump 10 and the second oil pump 11, it is possible to improve the pump efficiency of the first oil pump 10 and the second oil pump 11.

The output from the electric motor 60 that rotationally drives the third oil pump 30 is controlled by the controller 40. Thus, it is possible to freely change a discharge flow amount from the third oil pump 30 by changing the output from the electric motor 60.

As described above, with the working-fluid supply system 100, it is possible to supply the working oil to the automatic transmission 70 from three oil pumps, i.e. the first oil pump 10, the second oil pump 11, and the third oil pump 30.

The position of the first switching valve 22, the position of the second switching valve 25, and the position of the third switching valve 36 may be switched as a valve body (not shown) is directly driven by a solenoid (not shown) or may be switched by the presence/absence of the pilot pressure acting on the valve body, and as a driving system of these switching valves, any system may be employed as long as the positions are switched in accordance with instructions from the controller 40.

Figure 2:
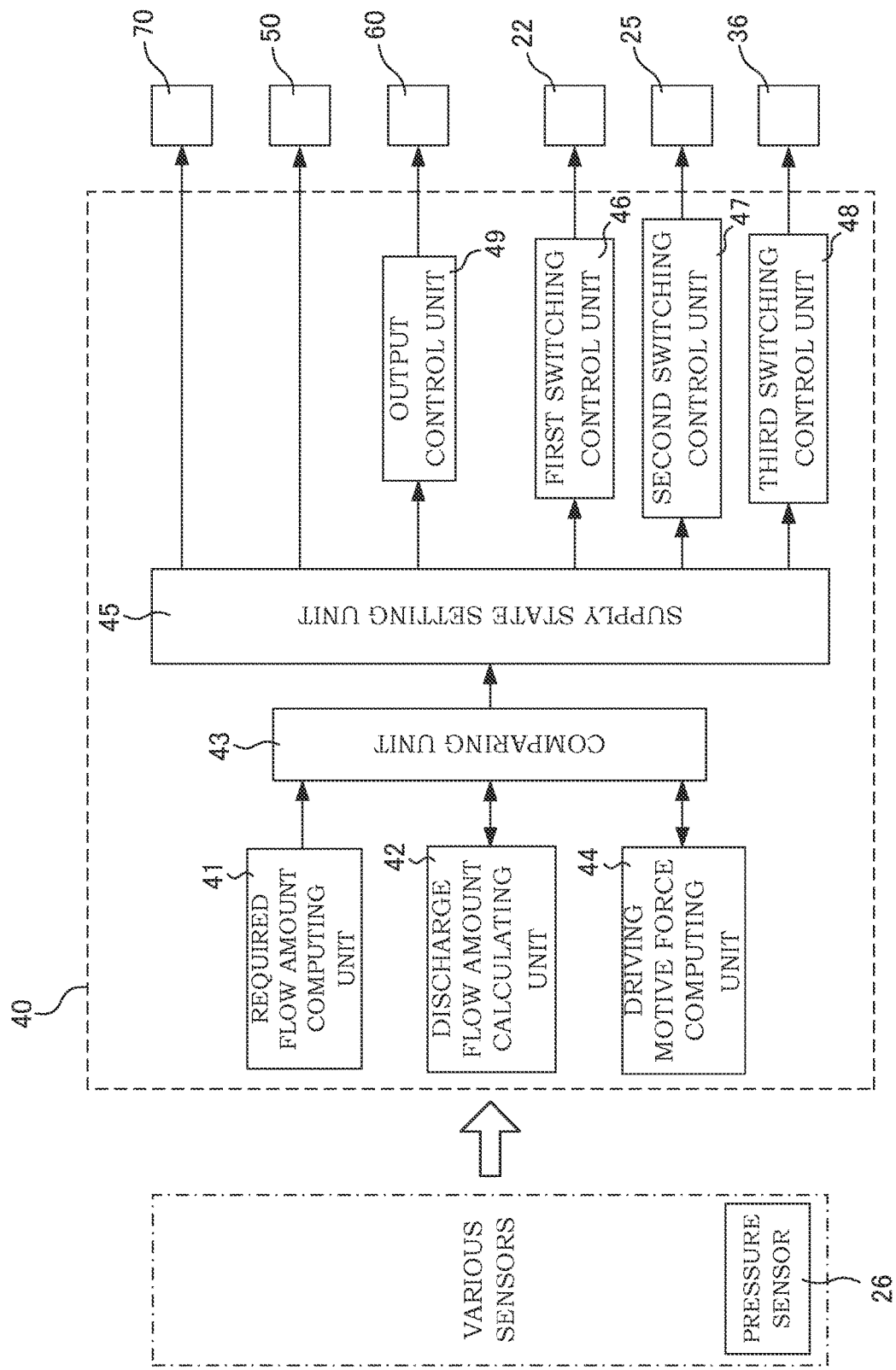
FIG. 2 is a block diagram for describing a function of a controller of the working-fluid supply system according to the first embodiment of the present invention.

Next, the controller 40 will be described with reference to FIG. 2. FIG. 2 is a block diagram for describing functions of the controller 40.

The controller 40 is formed of a microcomputer provided with a CPU (a central processing unit), a ROM (a read only memory), a RAM (a random access memory), and an I/O interface (an input/output interface). The RAM stores data for processing executed by the CPU, the ROM pre-stores a control program, etc. for the CPU, and the I/O interface is used for input/output of information to/from devices connected to the controller 40. The controller 40 may also be formed of a plurality of microcomputers.

The controller 40 controls the supply of the working oil to the automatic transmission 70 by controlling the electric motor 60 and each of the switching valves 22, 25, and 36 on the basis of the detected value from the pressure sensor 26 and signals indicating the state of the vehicle input from the various sensors respectively provided on parts of the vehicle. The controller 40 may be configured so as to serve both as a controller of the engine 50 and a controller of the automatic transmission 70, or it may be provided separately from the controller of the engine 50 and the controller of the automatic transmission 70.

The signals indicating the state of the vehicle to be input to the controller 40 include: for example, the signals indicating the speed of the vehicle; the signals indicating acceleration of the vehicle; the signals indicating the operating position of a shift lever; the signals indicating the operated amount of the accelerator; the signals indicating the rotation speed of the engine 50; the signals indicating the load of the engine 50 such as the throttle position, the fuel-injection amount, and so forth; the signals indicating the input shaft and output shaft rotation speeds of the automatic transmission 70; the signals indicating the oil temperature of the working oil in the automatic transmission 70; the signals indicating the pressure of the working oil (line pressure) supplied to the automatic transmission 70; the signals indicating the transmission gear ratio of the automatic transmission 70; the signals indicating the discharge pressure of the first oil pump 10; the signals indicating the discharge pressure of the second oil pump 11; the signals indicating the discharge pressure of the third oil pump 30; the signals indicating the rotation speed of the electric motor 60; and so forth.

The controller 40 has, as the functions for controlling the supply of the working oil to the automatic transmission 70: a required flow amount computing unit 41 that computes a required flow amount Qr of the working oil required by the automatic transmission 70 on the basis of the signals that are input from the various sensors; a discharge flow amount calculating unit 42 that calculates a first discharge flow amount Q1 of the working oil discharged from the first oil pump 10 and a second discharge flow amount Q2 of the working oil discharged from the second oil pump 11 on the basis of the signals that are input from the various sensors; a driving motive force computing unit 44 that computes a first driving motive force W1 of the first oil pump 10, a second driving motive force W2 of the second oil pump 11, and a third driving motive force W3 of the third oil pump 30 on the basis of the signals that are input from the various sensors; a comparing unit 43 that performs comparison of the flow amount computed by the required flow amount computing unit 41 with the flow amount that has been calculated by the discharge flow amount calculating unit 42 and comparison between the respective driving motive forces that have been computed by the driving motive force computing unit 44; and a supply state setting unit 45 that sets the supply state of the working oil to the automatic transmission 70 on the basis of a comparison result obtained by the comparing unit 43.

In addition, the controller 40 has a first switching control unit 46 that performs a switching control of the position of the first switching valve 22, a second switching control unit 47 that performs the switching control of the position of the second switching valve 25, a third switching control unit 48 that performs the switching control of the position of the third switching valve 36, and an output control unit 49 that controls the output from the electric motor 60. The required flow amount computing unit 41, etc. are shown as virtual units for the respective functions of the controller 40, and they do not imply that they physically exist.

The required flow amount computing unit 41 computes the flow amount of the working oil required by the automatic transmission 70 mainly on the basis of: an accelerator opening degree and a vehicle speed; the oil temperature of the working oil in the automatic transmission 70; the pressure of the working oil supplied to the automatic transmission 70; the input shaft and output shaft rotation speed of the automatic transmission 70; and the transmission gear ratio of the automatic transmission 70.

In the above, the flow amount of the working oil required by the automatic transmission 70 includes: a transmission flow amount required for changing a width between pulleys of a variator of the belt type continuously variable transmission (not shown); a leakage flow amount through a gap in a hydraulic control valve and a gap in a hydraulic circuit; a lubrication flow amount required for cooling or lubricating the automatic transmission 70; a cooling flow amount guided to an oil cooler (not shown); and so forth.

The extent of each of these flow amounts is mapped in advance and is stored in the ROM of the controller 40. Specifically, the transmission flow amount takes a larger value when the transmission gear ratio is changed largely, for example, at the time of acceleration at which a rate of increase of the accelerator opening degree is large and at the time of deceleration at which a rate of deceleration of the vehicle speed is large, and therefore, a rate of change of the accelerator opening degree and of the vehicle speed are used as the parameters. As the parameters related to the acceleration/deceleration of the vehicle, the throttle position, the fuel-injection amount, and so forth affecting the change in the rotation speed and the load of the engine 50 may also be used. The lower the viscosity of the working oil becomes due to the increase in the temperature of the working oil and the higher the pressure of the supplied working oil becomes, the larger the value of the leakage flow amount becomes, and therefore, the temperature and pressure of the working oil are used as the parameters.

In addition, the lower the viscosity of the working oil becomes due to the increase in the temperature of the working oil, the more likely an oil film shortage is to be caused, and therefore, the higher the temperature of the working oil is, the higher the lubrication flow amount needs to be set, and in addition, the higher a rotation speed of a rotation shaft in the automatic transmission 70 is, the more likely the oil film shortage is to be caused, and therefore, the higher the rotation speed of the rotation shaft in the automatic transmission 70 is, the higher the lubrication flow amount needs to be set. By taking these factors into consideration, for the lubrication flow amount, for example, the temperature of the working oil and the rotation speed of the input/output shaft of the automatic transmission 70 are used as the parameters.

In addition, from the view point of the lubricity, the retention of the oil film, and so forth, the temperature of the working oil needs to be kept so as not to exceed a predetermined temperature, and in addition, in order to cool the working oil, it is required to achieve a state in which cooling air is guided to the oil cooler, in other words, a state in which the vehicle is traveling at a predetermined vehicle speed or higher. Therefore, for the cooling flow amount, the temperature of the working oil and the vehicle speed are mainly used as the parameters. These parameters for determining the transmission flow amount, the leakage flow amount, the lubrication flow amount, and the cooling flow amount are only examples, and any parameters associated with the exemplified parameters may also be used, and so, selection of parameters is appropriately performed from the signals input to the controller 40 for determining the parameters.

As described above, the required flow amount computing unit 41 computes the required flow amount Qr that is an amount of the working oil required by the automatic transmission 70 per unit time by taking the transmission flow amount, the leakage flow amount, the lubrication flow amount, and the cooling flow amount into consideration.

The discharge flow amount calculating unit 42 calculates the first discharge flow amount Q1 that is the amount of the working oil discharged from the first oil pump 10 per unit time mainly on the basis of the rotation speed of the engine 50 and a preset first base discharged amount D1 that is the theoretical discharged amount per revolution of the first oil pump 10. The discharge flow amount calculating unit 42 also calculates the second discharge flow amount Q2 that is the amount of the working oil discharged from the second oil pump 11 per unit time mainly on the basis of the rotation speed of the engine 50 and a preset second base discharged amount D2 that is the theoretical discharged amount per revolution of the second oil pump 11.

The rotation speed of the first oil pump 10 and the first discharge flow amount Q1 of the first oil pump 10 are in a relationship in which they are changed substantially proportional to each other, and in addition, the first discharge flow amount Q1 of the first oil pump 10 is changed in response to the viscosity that varies with the oil temperature and the discharge pressure of the first oil pump 10. These relationships are mapped in advance in order to accurately calculate the first discharge flow amount Q1 of the first oil pump 10 and are stored in the ROM of the controller 40.

Because the rotation speed of the first oil pump 10 is changed in response to the rotation speed of the engine 50 driving the first oil pump 10, the discharge flow amount calculating unit 42 easily calculates the first discharge flow amount Q1 from the rotation speed of the engine 50, the oil temperature of the working oil, and the discharge pressure of the first oil pump 10.

The first discharge flow amount Q1 may be calculated by using the rotation speed of the first oil pump 10 instead of the rotation speed of the engine 50. In addition, because the discharge pressure of the first oil pump 10 is changed in response to the line pressure that is the pressure of the working oil supplied to the automatic transmission 70, the line pressure may also be used instead of the discharge pressure of the first oil pump 10 for the calculation of the first discharge flow amount Q1 of the first oil pump 10.

The second discharge flow amount Q2 of the second oil pump 11 is also calculated in a similar manner to the first discharge flow amount Q1 of the first oil pump 10. The calculation of the second discharge flow amount Q2 of the second oil pump 11 is performed regardless of the switched state of the first switching valve 22, in other words, regardless of whether or not the second oil pump 11 is in the state in which it supplies the working oil to the automatic transmission 70.

The driving motive force computing unit 44 computes the first driving motive force W1 of the first oil pump 10 and the second driving motive force W2 of the second oil pump 11, and computes the third driving motive force W3 of the third oil pump 30 for a case in which the working oil is discharged at a target discharge flow amount Qa that is set on the basis of the required flow amount Qr.

The first driving motive force W1 of the first oil pump 10 is the output expended to drive the first oil pump 10 in the engine 50 and is calculated from the first discharge flow amount Q1 of the first oil pump 10, a first discharge pressure P1, and a first pump mechanical efficiency ill. The first pump mechanical efficiency 111 that varies in response to the rotation speed of the first oil pump 10, the first discharge pressure P1, and the oil temperature of the working oil is mapped in advance and is stored in the ROM of the controller 40. As the first discharge flow amount Q1, the value calculated by the discharge flow amount calculating unit 42 is used.

The second driving motive force W2 of the second oil pump 11 is also calculated in a similar manner to the first driving motive force W1 of the first oil pump 10. A second pump mechanical efficiency η2 that varies in response to the rotation speed of the second oil pump 11, a second discharge pressure P2, and the oil temperature of the working oil is mapped in advance and stored in the ROM of the controller 40. In a case in which the position of the first switching valve 22 is set at the second position 22b and the working oil is not supplied from the second oil pump 11 to the automatic transmission 70, the second driving motive force W2 of the second oil pump 11 is estimated by assuming that a line pressure PL, which is the pressure of the working oil in the automatic transmission 70, is the second discharge pressure P2.

Similarly, the third driving motive force W3 of the third oil pump 30 is calculated from the target discharge flow amount Qa that is the target amount of the working oil discharged per unit time from the third oil pump 30, a third discharge pressure P3, and a third pump mechanical efficiency η3. The target discharge flow amount Qa is set so as to have different values for a case in which the working oil is supplied to the automatic transmission 70 only from the third oil pump 30 and for a case in which the working oil is supplied to the automatic transmission 70 from the third oil pump 30 together the first oil pump 10.

Specifically, in a case in which the working oil is supplied to the automatic transmission 70 only from the third oil pump 30, it is preferable that the target discharge flow amount Qa be set to the flow amount that is higher than the required flow amount Qr by about 10%, for example, and thereby, it is preferable that the target discharge flow amount Qa be set to the flow amount that allows a margin such that the flow amount does not become lower than the required flow amount Qr even if the state of the vehicle at the present is varied by some extent. In a case in which the working oil is supplied to the automatic transmission 70 together with the first oil pump 10, it is preferable that the target discharge flow amount Qa be set to the flow amount that is higher than a deficient flow amount Qs, which is obtained by subtracting the first discharge flow amount Q1 from the required flow amount Qr, by about 10%, for example, and thereby, it is preferable that the target discharge flow amount Qa be set to the flow amount that allows a margin such that the total flow amount of the first discharge flow amount Q1 and the target discharge flow amount Qa does not become lower than the required flow amount Qr even if the state of the vehicle at the present is varied by some extent.

In a case in which the electric motor 60 is stopped and the working oil is not supplied to the automatic transmission 70 from the third oil pump 30, the third driving motive force W3 of the third oil pump 30 is estimated by assuming that the line pressure PL that is the pressure of the working oil in the automatic transmission 70 is the third discharge pressure P3. Similarly to the first pump mechanical efficiency η1 and the second pump mechanical efficiency η2, the third pump mechanical efficiency η3 that varies in response to the rotation speed of the third oil pump 30, the third discharge pressure P3, and the oil temperature of the working oil is mapped in advance and stored in the ROM of the controller 40. Because the third driving motive force W3 of the third oil pump 30 corresponds to the electric power consumed by the electric motor 60 driving the third oil pump 30, the third driving motive force W3 of the third oil pump 30 may be calculated on the basis of the electric current and the voltage supplied to the electric motor 60.

In the above, the electric power generated by an alternator driven by the engine 50 is supplied to the electric motor 60 via a battery. Thus, in order to match the driving condition of the first oil pump 10 and the second oil pump 11 with the driving condition of the third oil pump 30, when the computation of the third driving motive force W3 of the third oil pump 30 is to be performed, various energy conversion efficiencies, such as a motor efficiency of the electric motor 60, a generation efficiency of the alternator, a charge/discharge efficiency of the battery, and so forth, are further taken into consideration. In other words, the finally computed third driving motive force W3 of the third oil pump 30 is the output consumed by the engine 50 when it is assumed that the third oil pump 30 is driven by the engine 50.

The methods of computing the respective driving motive force W1, W2, and W3 are not limited to the computing methods described above, and any sort of computing methods may be used as long as it is possible to compute the respective driving motive force W1, W2, and W3 that is required when the driving conditions of the respective oil pumps 10, 11, and 30 are set to the same condition. In addition, in a case in which the respective discharge pressures P1, P2, and P3 are not directly detected, the respective driving motive force W1, W2, and W3 may be computed by assuming the line pressure PL as the respective discharge pressures P1, P2, and P3 regardless of the supply state of the working oil.

As described below, the comparing unit 43 performs the comparison of the required flow amount Qr computed by the required flow amount computing unit 41 with the first discharge flow amount Q1 calculated by the discharge flow amount calculating unit 42 and the comparison of the total flow amount of the first discharge flow amount Q1 and the second discharge flow amount Q2 with the required flow amount Qr, and sends the signals corresponding to these comparison results to the driving motive force computing unit 44 and the supply state setting unit 45. In addition, as described below, the comparing unit 43 performs the comparison of the first driving motive force W1 of the first oil pump 10 computed by the driving motive force computing unit 44 with the third driving motive force W3 of the third oil pump 30 computed by the driving motive force computing unit 44 and the comparison of the total motive force of the first driving motive force W1 and the third driving motive force W3 with the total motive force of the first driving motive force W1 and the second driving motive force W2, and sends the signals corresponding to these comparison results to the supply state setting unit 45.

The supply state setting unit 45 sets the supply state of the working oil to the automatic transmission 70 on the basis of the signals sent from the comparing unit 43. Specifically, by appropriately controlling the first switching valve 22, the engine 50, the electric motor 60, and the automatic transmission 70 in accordance with the signals sent from the comparing unit 43, the supply state setting unit 45 sets the supply state from four supply states: a first supply state in which a state in which the working oil is not supplied to the automatic transmission 70 from the second oil pump 11 is achieved by switching the position of the first switching valve 22 to the second position 22b by the first switching control unit 46 and in which the working oil is supplied to the automatic transmission 70 only from the first oil pump 10 by stopping the electric motor 60; a second supply state in which the working oil is supplied to the automatic transmission 70 from the first oil pump 10 and the third oil pump 30 by achieving a state in which the working oil is not supplied to the automatic transmission 70 from the second oil pump 11 by switching the position of the first switching valve 22 to the second position 22b by the first switching control unit 46; a third supply state in which the working oil is supplied to the automatic transmission 70 from the first oil pump 10 and the second oil pump 11 by stopping the electric motor 60; and a fourth supply state in which the working oil is supplied to the automatic transmission 70 from three pumps, i.e. the first oil pump 10, the second oil pump 11, and the third oil pump 30.

Figure 3:
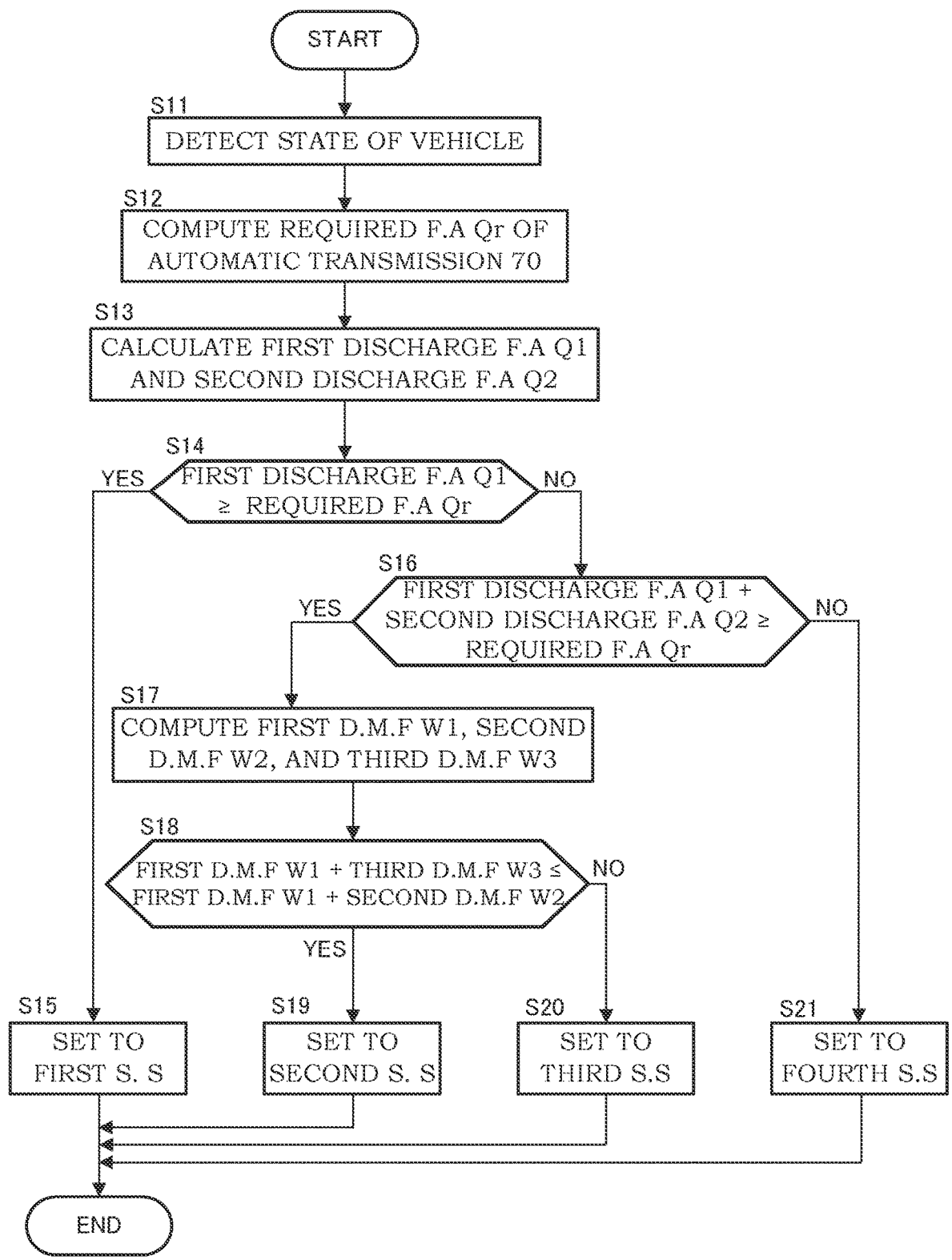
FIG. 3 is a flow chart showing a procedure of a supply state setting control executed by the controller of the working-fluid supply system according to the first embodiment of the present invention.

Next, the supply control of the working oil to the automatic transmission 70 that is performed by the controller 40 having the above-described functions will be described with reference to a flow chart in FIG. 3. The control shown in FIG. 3 is executed repeatedly at predetermined time intervals by the controller 40.

First of all, in step S11, detection signals indicating the state of the vehicle, especially the states of the engine 50 and the automatic transmission 70, are input to the controller 40 from the various sensors.

In step S12, on the basis of the signals from the various sensors that are input in step S11, the required flow amount Qr of the working oil that is required by the automatic transmission 70 is computed by the required flow amount computing unit 41.

In following step S13, on the basis of the signals from the various sensors that are input in step S11, the first discharge flow amount Q1 of the working oil discharged from the first oil pump 10 and the second discharge flow amount Q2 of the working oil discharged from the second oil pump 11 are calculated by the discharge flow amount calculating unit 42. In a case in which the specification of the first oil pump 10 and the specification of the second oil pump 11 are identical to each other, and the first discharge flow amount Q1 and the second discharge flow amount Q2 are the same value, it suffices to calculate either one of them.

The required flow amount Qr that is computed in step S12 and the first discharge flow amount Q1 that is calculated in step S13 are compared by the comparing unit 43 in step S14.

In step S14, when it is determined that the first discharge flow amount Q1 is equal to or higher than the required flow amount Qr, in other words, when it is possible to cover the required flow amount Qr of the working oil that is required by the automatic transmission 70 only by the first oil pump 10, the process proceeds to step S15.

In step S15, the supply state of the working oil to the automatic transmission 70 is set to the first supply state by the supply state setting unit 45. In this case, because the required flow amount Qr of the working oil that is required by the automatic transmission 70 is relatively low, it is possible to cover the required flow amount Qr only by driving the first oil pump 10.

Specifically, such a situation includes: a case in which the vehicle is in the steady travelling state at which a sudden acceleration and a sudden deceleration are not performed and in which there is almost no increase/decrease in the transmission flow amount; a case in which the leakage flow amount is relatively low because the oil temperature of the working oil is at or lower than 120° C., for example; a case in which the cooling flow amount is not required to be ensured because the oil temperature of the working oil is low to medium temperature; and so forth.

On the other hand, in step S14, when it is determined that the first discharge flow amount Q1 is lower than the required flow amount Qr, in other words, when the required flow amount Qr of the working oil that is required by the automatic transmission 70 cannot be covered only by the first oil pump 10, the process proceeds to step S16.

In step S16, the required flow amount Qr that is computed in step S12 and the total flow amount of the first discharge flow amount Q1 and the second discharge flow amount Q2 that is calculated in step S13 are compared by the comparing unit 43.

In step S16, when it is determined that the total flow amount of the first discharge flow amount Q1 and the second discharge flow amount Q2 is equal to or higher than the required flow amount Qr, in other words, when the required flow amount Qr of the working oil that is required by the automatic transmission 70 can be covered by the first oil pump 10 and the second oil pump 11, the process proceeds to step S17.

In step S17, on the basis of the signals from the various sensors that are input in step S11, the first driving motive force W1 of the first oil pump 10, the second driving motive force W2 of the second oil pump 11, and the third driving motive force W3 of the third oil pump 30 are computed by the driving motive force computing unit 44.

The total motive force of the first driving motive force W1 and the third driving motive force W3 that are computed by the driving motive force computing unit 44 is compared by the comparing unit 43 in step S18 with the total motive force of the first driving motive force W1 and the second driving motive force W2 that are computed by the driving motive force computing unit 44.

In the above, when the required flow amount Qr is slightly higher than the first discharge flow amount Q1, if the second oil pump 11 is driven in addition to the first oil pump 10, the amount of the oil supplied to the automatic transmission 70 becomes excessive, and as a result, the output from the engine 50 will be wastefully consumed.

In such a case, rather than driving the second oil pump 11 in addition to the first oil pump 10, there is a better possibility to suppress the fuel consumption in the engine 50 by causing the third oil pump 30 to be driven by the electric motor 60 to cover the deficient flow amount Qs that is obtained by subtracting the first discharge flow amount Q1 from the required flow amount Qr.

In other words, in step S18, it is determined in which of the cases, i.e. a case in which the working oil is supplied by driving the first oil pump 10 and the second oil pump 11 and a case in which the working oil is supplied by driving the first oil pump 10 and the third oil pump 30, the fuel consumption of the engine 50 can be better reduced.

In step S18, when it is determined that the total motive force of the first driving motive force W1 and the third driving motive force W3 is equal to or smaller than the total motive force of the first driving motive force W1 and the second driving motive force W2, in other words, when the fuel consumption of the engine 50 can be better reduced by supplying the working oil by driving the first oil pump 10 by the engine 50 and by driving the third oil pump 30 by the electric motor 60, the process proceeds to step S19, and the supply state of the working oil to the automatic transmission 70 is set to the second supply state by the supply state setting unit 45.

On the other hand, in step S18, when it is determined that the total motive force of the first driving motive force W1 and the third driving motive force W3 is larger than the total motive force of the first driving motive force W1 and the second driving motive force W2, in other words, when the fuel consumption of the engine 50 can be better reduced by supplying the working oil by driving the first oil pump 10 and the second oil pump 11 by the engine 50, the process proceeds to step S20, and the supply state of the working oil to the automatic transmission 70 is set to the third supply state by the supply state setting unit 45.

In the above, even in a travelling state with acceleration/deceleration, the amount of the working oil that is required by the automatic transmission 70 varies depending on degree of acceleration/deceleration. Thus, for example, the supply state of the working oil to the automatic transmission 70 is set to the second supply state when the rate of change of the vehicle speed is equal to or lower than a predetermined value and the required flow amount Qr is relatively low, and the supply state is set to the third supply state when the rate of change of the vehicle speed is higher than the predetermined value and the required flow amount Qr is relatively high. In addition, when the temperature of the working oil is low, because the viscosity of the working oil is increased, if the working oil is to be supplied by the third oil pump 30, the load applied to the electric motor 60 is increased. Thus, the supply state of the working oil to the automatic transmission 70 is switched between the second supply state and the third supply state depending on the temperature of the working oil, for example.

As described above, the supply state of the working oil to the automatic transmission 70 is switched to an appropriate supply state in which the fuel consumption of the engine 50 can be reduced in the operation state in which the required flow amount Qr is relatively high. As a result, even at the time of travelling with acceleration/deceleration in which the required flow amount Qr is relatively increased, it is possible to improve the fuel efficiency of the vehicle.

On the other hand, in step S16, when it is determined that the total flow amount of the first discharge flow amount Q1 and the second discharge flow amount Q2 is lower than the required flow amount Qr, in other words, when the required flow amount Qr of the working oil required by the automatic transmission 70 cannot be covered by the first oil pump 10 and the second oil pump 11, the process proceeds to step S21.

In step S21, the supply state of the working oil to the automatic transmission 70 is set to the fourth supply state by the supply state setting unit 45. In this case, the required flow amount Qr of the working oil that is required by the automatic transmission 70 is relatively high, and in order to ensure the required flow amount Qr, the third oil pump 30 is driven in addition to the first oil pump 10 and the second oil pump 11.

Specifically, such a situation includes: a case in which the transmission flow amount is increased by the sudden acceleration and/or the sudden deceleration; a case in which the leakage flow amount is increased as the oil temperature of the working oil becomes a high temperature exceeding 130° C., for example; a case in which sufficient cooling flow amount needs to be ensured because the oil temperature of the working oil is high temperature and the vehicle speed is increased to the speed equal to or higher than medium speed (30 to 50 km/h); and so forth.

As described above, by appropriately switching the supply state of the working oil to the automatic transmission 70 on the basis of the state of the vehicle, the state of the engine 50 and the automatic transmission 70 in particular, the working oil is sufficiently supplied to the automatic transmission 70 and the wasteful consumption of the fuel in the engine 50 is suppressed. As a result, it is possible to stably operate the automatic transmission 70 and to improve the fuel efficiency of the vehicle.

If the supply state of the working oil to the automatic transmission 70 is switched frequently, the pressure of the working oil supplied to the automatic transmission 70 is varied and the control of the automatic transmission 70 may become unstable, and so, hysteresis may be set when the comparison is performed by the comparing unit 43 so as to suppress frequent switching of the supply state. In addition, if the amount of the working oil supplied to the automatic transmission 70 does not become lower than the required flow amount Qr after the setting has been done to any of supply states, the shift to other supply state may be prohibited for a predetermined period of time.

The controller 40 performs the supply control of the working oil to the automatic transmission 70 as described above, and in a case in which the working oil is not supplied to the automatic transmission 70 by the second oil pump 11, the controller 40 performs a first returning flow control in which the working oil that has been discharged from the second oil pump 11 is returned to the suction side of the first oil pump 10.

Figure 4:
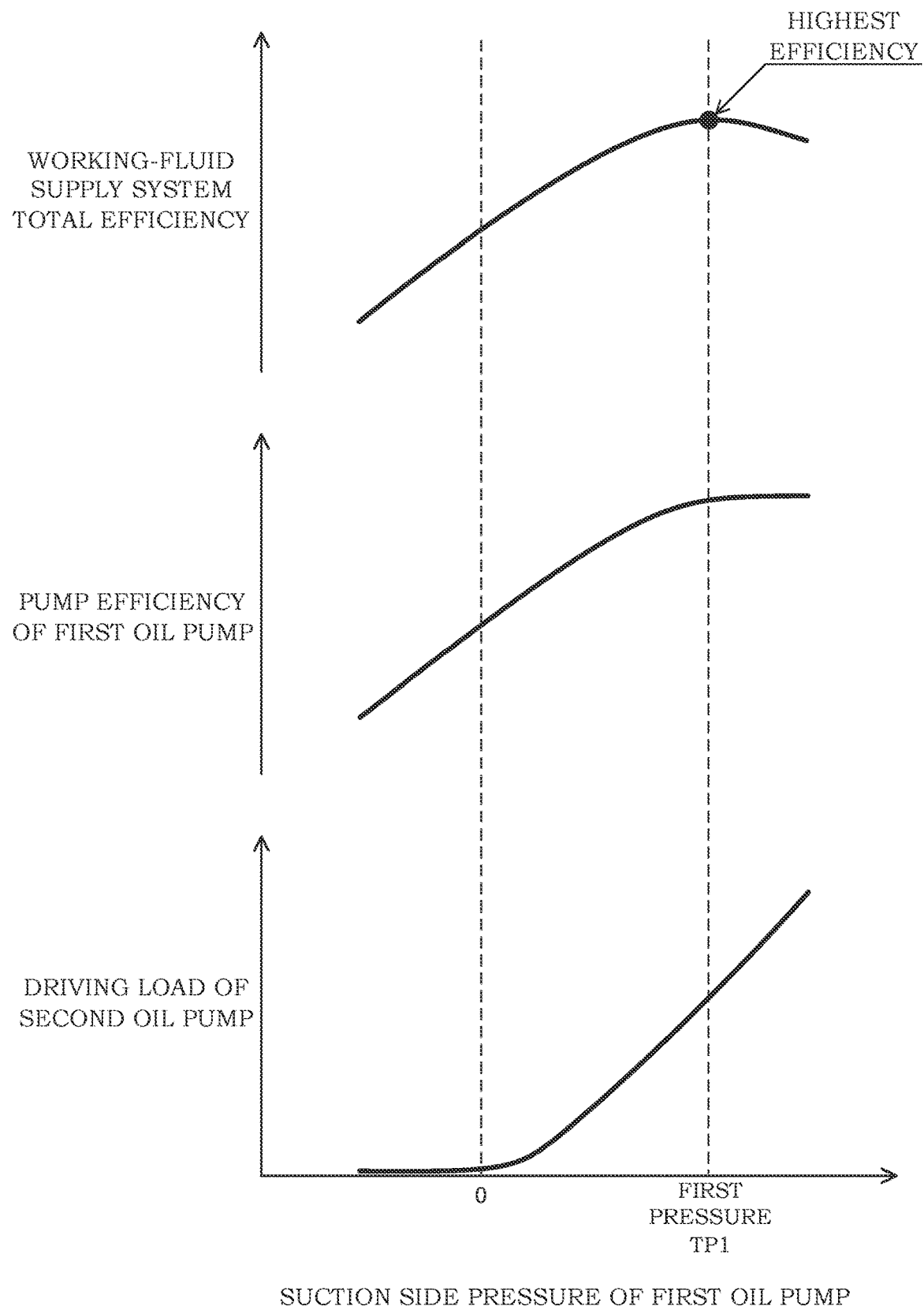
FIG. 4 is a diagram for describing a first returning flow control executed by the controller of the working-fluid supply system according to the first embodiment of the present invention.

In the above, especially when the first oil pump 10 is rotated at a high speed, it is possible to make it difficult for the cavitation to be caused on the suction side of the first oil pump 10 by returning the working oil that has been discharged from the second oil pump 11 to the suction side of the first oil pump 10. In addition, as the pressure on the suction side of the first oil pump 10 is increased by returning the working oil that has been discharged from the second oil pump 11 to the suction side of the first oil pump 10, it is possible to improve the pump efficiency of the first oil pump 10 as shown in FIG. 4. FIG. 4 shows changes in the total efficiency of the working-fluid supply system 100, the pump efficiency of the first oil pump 10, and the driving load of the second oil pump 11 with respect to the pressure on the suction side of the first oil pump 10.

However, even if the amount of the working fluid supplied from the second oil pump 11 is increased to increase the pressure on the suction side of the first oil pump 10 in order to improve the pump efficiency of the first oil pump 10, the suction by the first oil pump 10 cannot follow the increase due to a pressure loss, etc. at a suction part especially when the first oil pump 10 is being rotated at a high speed, and as a result, it becomes difficult to improve the pump efficiency even if the pressure on the suction side of the first oil pump 10 is increased from a certain degree.

In addition, of course, as the pressure on the suction side of the first oil pump 10 is increased, in other words, as the pressure on the discharge side of the second oil pump 11 is increased, the driving load of the second oil pump 11 is increased.

As the pressure on the suction side of the first oil pump 10 is increased as described above, while the pump efficiency of the first oil pump 10 becomes harder to be increased, the driving load of the second oil pump 11 is increased, and therefore, the total efficiency of the working-fluid supply system 100 is decreased if the pressure on the suction side of the first oil pump 10 is increased excessively.

In other words, as shown in FIG. 4, when the pressure on the suction side of the first oil pump 10 is increased gradually, although the total efficiency of the working-fluid supply system 100 is increased until the pressure on the suction side of the first oil pump 10 reaches a predetermined first pressure TP1, the total efficiency is reduced if the pressure on the suction side of the first oil pump 10 is increased further. In other words, the total efficiency of the working-fluid supply system 100 reaches the highest efficiency when the pressure on the suction side of the first oil pump 10 reaches the predetermined first pressure TP1.

Therefore, in the first returning flow control in which the working oil that has been discharged from the second oil pump 11 is supplied to the suction side of the first oil pump 10, in order to improve the total efficiency of the working-fluid supply system 100, the working oil that has been discharged from the second oil pump 11 is not simply supplied to the suction side of the first oil pump 10, but the supply of the working oil from the second oil pump 11 is controlled by a first pressure control unit, which will be described below, such that the pressure on the suction side of the first oil pump 10 becomes the predetermined first pressure TP1.

Figure 5:
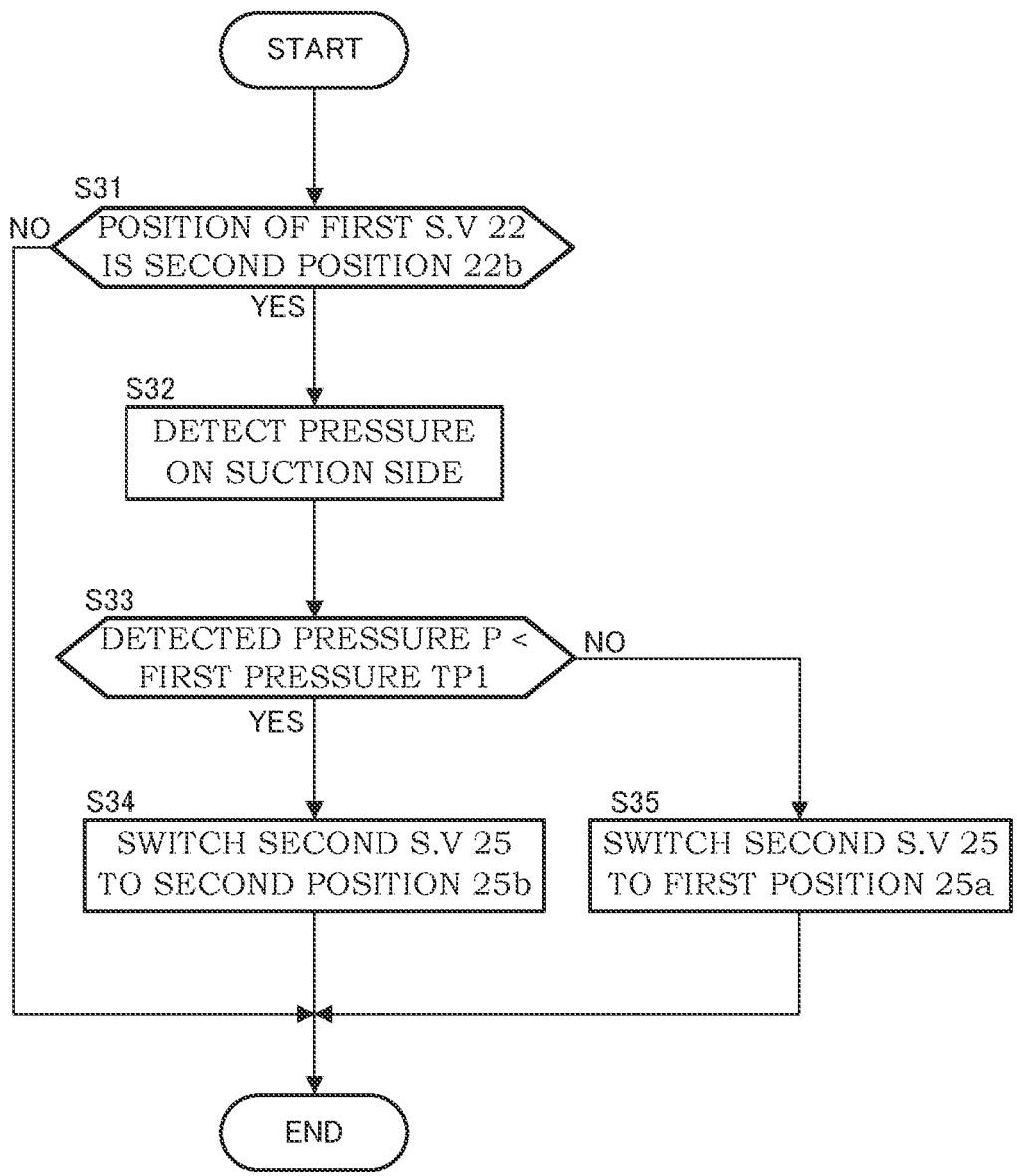
FIG. 5 is a flow chart showing a procedure of the first returning flow control executed by the controller of the working-fluid supply system according to the first embodiment of the present invention.

Next, the first returning flow control will be described with reference to a flow chart in FIG. 5. The control shown in FIG. 5 is executed repeatedly at predetermined time intervals by the controller 40.

First of all, in step S31, the controller 40 determines whether or not the position of the first switching valve 22 is set at the second position 22*b*. As described above, when the supply state is set at the first supply state or the second supply state by the supply state setting unit 45, the first switching valve 22 is switched to the second position 22*b* by the first switching control unit 46. Thus, when the supply state is set at the first supply state or the second supply state, the controller 40 determines that the position of the first switching valve 22 is set at the second position 22*b*. The determination of the position of the first switching valve 22 may also be performed on the basis of the detected value from a position sensor (not shown) capable of detecting the position of the first switching valve 22.

In step S31, when it is determined that the position of the first switching valve 22 is set at the second position 22*b*, the process proceeds to step S32, and the detection of the pressure on the suction side of the first oil pump 10 is performed. On the other hand, in step S31, when it is determined that the position of the first switching valve 22 is not set at the second position 22*b*, it is determined to be in a state in which the working oil that has been discharged from the second oil pump 11 cannot be supplied to the suction side of the first oil pump 10, and the process is terminated once.

In step S32, a detected pressure P detected by the pressure sensor 26 is obtained, and in following step S33, the comparison of the obtained detected pressure P with a first pressure TP1 that is the target pressure is performed. The first pressure TP1 is the pressure on the suction side of the first oil pump 10 at the time when the total efficiency of the working-fluid supply system 100 is estimated to be the highest efficiency, and the first pressure TP1 is set in advance by the target pressure setting unit in the controller 40 on the basis of the pump efficiency of the first oil pump 10 and the driving load of the second oil pump 11. The first pressure TP1 may be mapped and stored in the ROM of the controller 40 in advance.

In a case in which the detected pressure P is lower than the first pressure TP1, the process proceeds to step S34, and the position of the second switching valve 25 is switched to the second position 25*b* by the second switching control unit 47. By doing so, the working oil that has been discharged from the second oil pump 11 is supplied to the suction side of the first oil pump 10 through the first returning flow passage 20 and the second returning flow passage 23.

On the other hand, in a case in which the detected pressure P is equal to or higher than the first pressure TP1, the process proceeds to step S35, and the position of the second switching valve 25 is switched to the first position 25*a* by the second switching control unit 47. By doing so, the working oil that has been discharged from the second oil pump 11 is discharged to the tank T through the first returning flow passage 20 and the branch passage 24 without being supplied to the suction side of the first oil pump 10.

As described above, in a case in which the working oil that has been discharged from the second oil pump 11 can be supplied to the suction side of the first oil pump 10, the second switching valve 25 and the second switching control unit 47 function as the first pressure control unit, and the first pressure control unit is operated such that the pressure on the suction side of the first oil pump 10 approaches the first pressure TP1 that is the target pressure.

In a case in which the first pressure TP1 that is set in the first returning flow control is relatively high and in which the pressure in the second discharge pipe 17 that communicates with the first suction pipe 12 through the first returning flow passage 20 and the second returning flow passage 23 is relatively high, if the first switching valve 22 is switched to the first position 22*a*, the pressure in the first discharge pipe 13 that supplies the working oil to the automatic transmission 70 is increased suddenly, and a malfunction of the automatic transmission 70 may be caused. Thus, after the first returning flow control is performed, when the position of the first switching valve 22 is to be switched from the second position 22*b* to the first position 22*a*, it is preferred that the pressure in the second discharge pipe 17 be lowered by setting the position of the second switching valve 25 at the first position 25*a* to allow the second discharge pipe 17 to communicate with the tank T temporarily before performing the switching.

By performing the first returning flow control as described above, it is possible to make it difficult for the cavitation to be caused on the suction side of the first oil pump 10 by suppressing the excessive reduction of the pressure on the suction side of the first oil pump 10 to the negative pressure, and at the same time, it is possible to improve the pump efficiency of the first oil pump 10 by increasing the pressure on the suction side of the first oil pump 10. Furthermore, by controlling the supply of the working oil from the second oil pump 11 to the suction side of the first oil pump 10 such that the pressure on the suction side of the first oil pump 10 becomes the predetermined first pressure TP1, an excessive increase of the driving load of the second oil pump 11 is suppressed, and thereby, it is possible to improve the total efficiency of the working-fluid supply system 100.

In addition, in a case in which, when the rotation speed of the engine 50 is low and the rotation speed of the first oil pump 10 is also low, the required flow amount Qr of the working oil that is required by the automatic transmission 70 can be covered by the first oil pump 10 only even though the required flow amount Qr is relatively high, a situation in which the degree of the negative pressure on the suction side of the first oil pump 10 is increased and in which the cavitation is likely to be caused is established. However, by performing the first returning flow control in which the working oil that has been discharged from the second oil pump 11 is supplied to the suction side of the first oil pump 10 as described above, it is possible to make it difficult for the cavitation to be caused.

In the above-described first returning flow control, the level of the first pressure TP1 is set with the intention of improving the total efficiency of the working-fluid supply system 100. Instead, the level of the first pressure TP1 may also be set with the intention of suppressing the generation of cavitation on the suction side of the first oil pump 10. In this case, the level of the first pressure TP1 is set at the value that is shifted slightly towards the positive pressure, for example, such that the pressure on the suction side of the first oil pump 10 does not become the negative pressure. By doing so, the generation of the cavitation is surely avoided on the suction side of the first oil pump 10.

In addition, the level of the first pressure TP1 may also be set at the level at which the driving load of the second oil pump 11, which is substantially in the no-load operation state, is not increased excessively. In this case, the level of the first pressure TP1 is set, for example, at a pressure value that is obtained when the driving load of the second oil pump 11 has become an arbitrary multiple (preferably, the multiple of about 1.1) of the driving load of the second oil pump 11 at the time when the working oil that has been discharged from the second oil pump 11 is discharged to the tank T through the first returning flow passage 20 and the branch passage 24. By doing so, it is possible to avoid the excessive increase of the driving load of the second oil pump 11 and the deterioration of the total efficiency of the working-fluid supply system 100.

When only the third oil pump 30 is in a state in which the working oil is not supplied to the automatic transmission 70, in addition to the above-described first returning flow control, the controller 40 performs a second returning flow control in which the working oil that has been discharged from the third oil pump 30 is supplied to the suction sides of the first oil pump 10 and the second oil pump 11.

Figure 6:
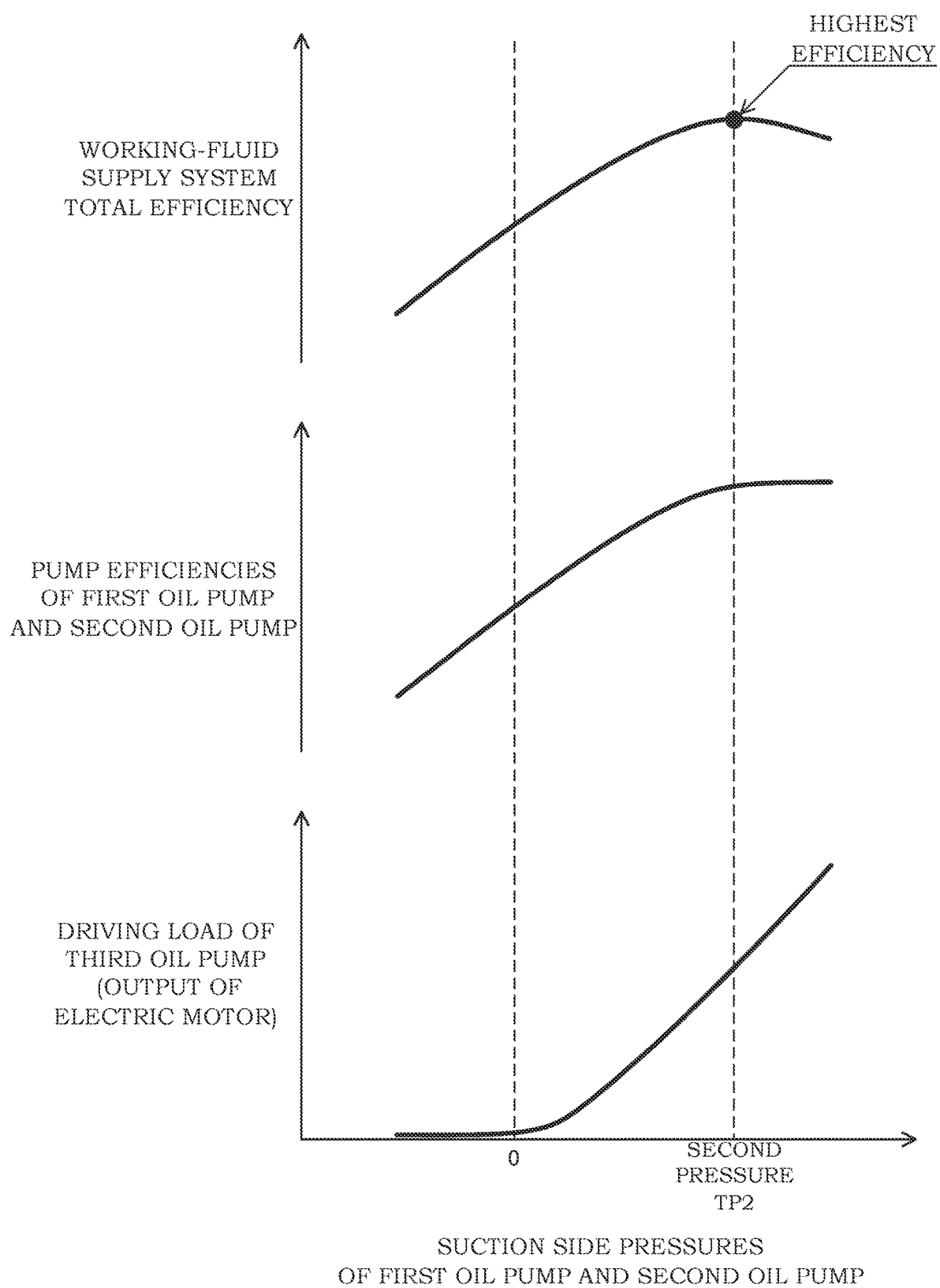
FIG. 6 is a diagram for describing a second returning flow control executed by the controller of the working-fluid supply system according to the first embodiment of the present invention.

In the above, especially when the first oil pump 10 and the second oil pump 11 are rotated at a high speed, it is possible to make it difficult for the cavitation to be caused on the suction sides of the first oil pump 10 and the second oil pump 11 by supplying the working oil that has been discharged from the third oil pump 30 to the suction sides of the first oil pump 10 and the second oil pump 11. In addition, as the pressures on the suction sides of the first oil pump 10 and the second oil pump 11 is increased by supplying the working oil that has been discharged from the third oil pump 30 to the suction sides of the first oil pump 10 and the second oil pump 11, it is possible to improve the pump efficiency of the first oil pump 10 and the second oil pump 11 as shown in FIG. 6. FIG. 6 shows changes in the total efficiency of the working-fluid supply system 100, the pump efficiencies of the first oil pump 10 and the second oil pump 11, and the driving load of the third oil pump 30 with respect to the pressures on the suction sides of the first oil pump 10 and the second oil pump 11.

However, even if the amount of the working fluid supplied from the third oil pump 30 is increased to increase the pressures on the suction sides of the first oil pump 10 and the second oil pump 11 in order to improve the pump efficiencies of the first oil pump 10 and the second oil pump 11, the suction by the first oil pump 10 and the second oil pump 11 cannot follow the increase due to the pressure loss, etc. at the suction part especially when the first oil pump 10 and the second oil pump 11 are being rotated at a high speed, and as a result, it becomes difficult to improve the pump efficiency even if the pressures on the suction sides of the first oil pump 10 and the second oil pump 11 are increased from a certain degree.

In addition, of course, as the pressures on the suction sides of the first oil pump 10 and the second oil pump 11 are increased, in other words, as the pressure on the discharge side of the third oil pump 30 is increased, the output from the electric motor 60 that is the driving load of the third oil pump 30 is increased, and as a result, the electric power consumption of the electric motor 60 is increased.

As the pressures on the suction sides of the first oil pump 10 and the second oil pump 11 are increased as described above, while the pump efficiencies of the first oil pump 10 and the second oil pump 11 becomes harder to be increased, the driving load of the third oil pump 30 is increased, and therefore, the total efficiency of the working-fluid supply system 100 is decreased if the pressures on the suction sides of the first oil pump 10 and the second oil pump 11 are increased excessively.

In other words, as shown in FIG. 6, when the pressure on the suction side of the first oil pump 10 is increased gradually, although the total efficiency of the working-fluid supply system 100 is increased until the pressures on the suction sides of the first oil pump 10 and the second oil pump 11 reach a predetermined second pressure TP2, the total efficiency is reduced if the pressures on the suction sides of the first oil pump 10 and the second oil pump 11 are increased further. In other words, the total efficiency of the working-fluid supply system 100 reaches the highest efficiency when the pressures on the suction sides of the first oil pump 10 and the second oil pump 11 reach the predetermined second pressure TP2.

Therefore, in the second returning flow control in which the working oil that has been discharged from the third oil pump 30 is supplied to the suction sides of the first oil pump 10 and the second oil pump 11, in order to improve the total efficiency of the working-fluid supply system 100, the working oil that has been discharged from the third oil pump 30 is not simply supplied to the suction sides of the first oil pump 10 and the second oil pump 11, but the supply of the working oil from the third oil pump 30 is controlled by a second pressure control unit, which will be described below, such that the pressures on the suction sides of the first oil pump 10 and the second oil pump 11 become the predetermined second pressure TP2.

Figure 7:
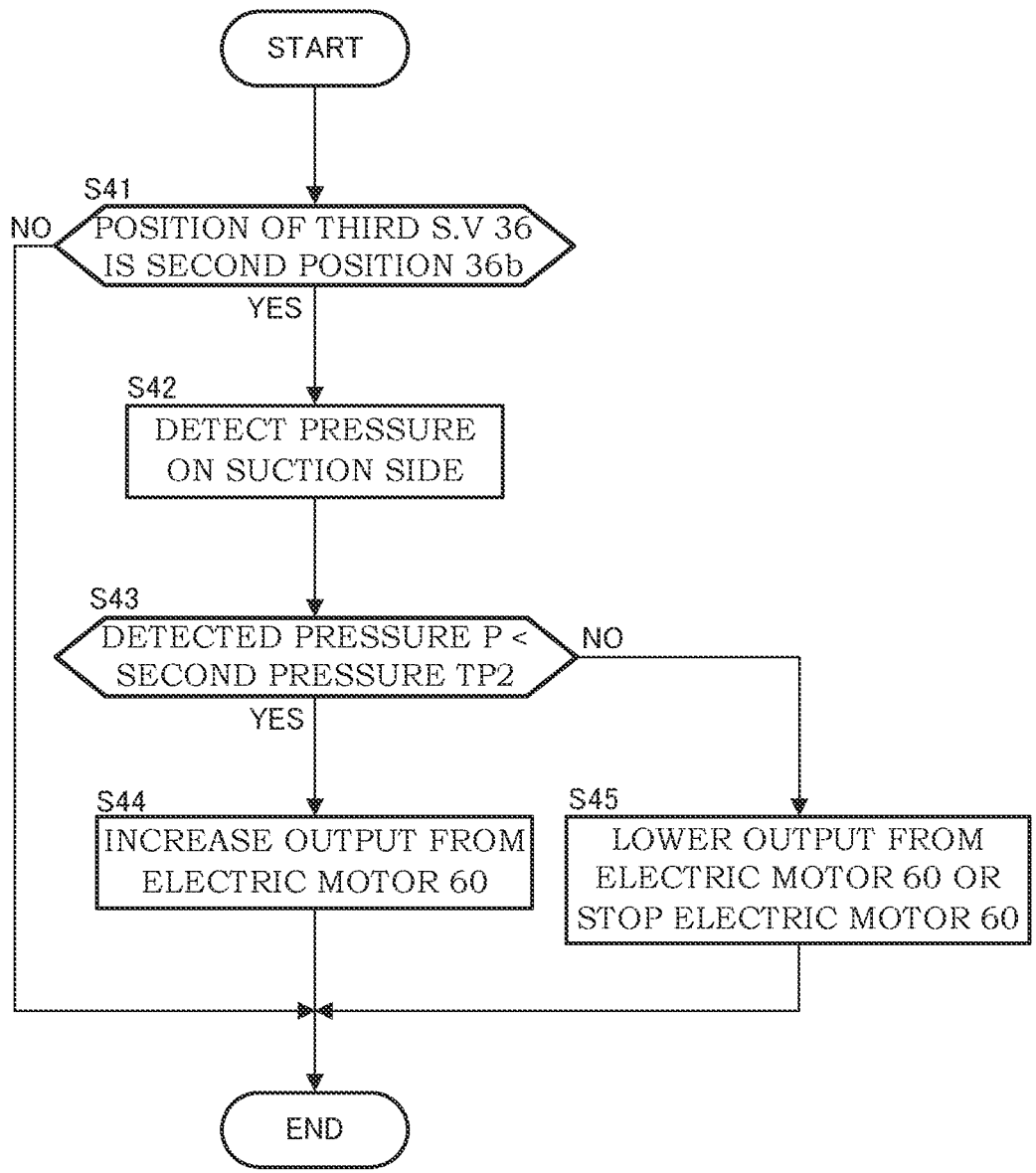
FIG. 7 is a flow chart showing a procedure of the second returning flow control executed by the controller of the working-fluid supply system according to the first embodiment of the present invention.

Next, the second returning flow control will be described with reference to a flow chart in FIG. 7. The control shown in FIG. 7 is executed repeatedly at predetermined time intervals by the controller 40.

First of all, in step S41, the controller 40 determines whether or not the position of the third switching valve 36 is set at the second position 36b. As described above, when the supply state is set at the third supply state by the supply state setting unit 45, the third switching valve 36 is switched to the second position 36b by the third switching control unit 48. Thus, when the supply state is set at the third supply state, the controller 40 determines that the position of the third switching valve 36 is set at the second position 36b. The determination of the position of the third switching valve 36 may also be performed on the basis of the detected value from the position sensor (not shown) capable of detecting the position of the third switching valve 36.

In step S41, when it is determined that the position of the third switching valve 36 is set at the second position 36b, the process proceeds to step S42, and the detection of the pressures on the suction sides of the first oil pump 10 and the second oil pump 11 is performed. On the other hand, in step S41, when it is determined that the position of the third switching valve 36 is not set at the second position 36b, it is determined to be in a state in which the working oil that has been discharged from the third oil pump 30 cannot be supplied to the suction sides of the first oil pump 10 and the second oil pump 11, and the process is terminated once.

In step S42, the detected pressure P detected by the pressure sensor 26 is obtained, and in following step S43, the comparison of the obtained detected pressure P with the second pressure TP2 that is the target pressure is performed. The second pressure TP2 is the pressures on the suction sides of the first oil pump 10 and the second oil pump 11 at the time when the total efficiency of the working-fluid supply system 100 is estimated to be the highest efficiency, and the second pressure TP2 is set in advance by the target pressure setting unit in the controller 40 on the basis of the pump efficiencies of the first oil pump 10 and the second oil pump 11 and the driving load of the third oil pump 30. The second pressure TP2 may be mapped and stored in the ROM of the controller 40 in advance.

In a case in which the detected pressure P is lower than the second pressure TP2, the process proceeds to step S44, and the output from the electric motor 60 is increased by the output control unit 49. By doing so, the flow amount of the working oil supplied from the third oil pump 30 to the suction sides of the first oil pump 10 and the second oil pump 11 through the third returning flow passage 34 is increased.

On the other hand, in a case in which the detected pressure P is equal to or higher than the second pressure TP2, the process proceeds to step S45, and the output from the electric motor 60 is reduced or the electric motor 60 is stopped by the output control unit 49. By doing so, the flow amount of the working oil supplied from the third oil pump 30 to the suction sides of the first oil pump 10 and the second oil pump 11 through the third returning flow passage 34 is reduced.

As described above, in a case in which the working oil that has been discharged from the third oil pump 30 can be supplied to the suction sides of the first oil pump 10 and the second oil pump 11, the output control unit 49 functions as the second pressure control unit, and the second pressure control unit is operated such that the pressures on the suction sides of the first oil pump 10 and the second oil pump 11 approach the second pressure TP2 that is the target pressure.

By performing the second returning flow control as described above, it is possible to make it difficult for the cavitation to be caused on the suction sides of the first oil pump 10 and the second oil pump 11 by suppressing the excessive reduction of the pressures on the suction sides of the first oil pump 10 and the second oil pump 11 to the negative pressure, and at the same time, it is possible to improve the pump efficiency of the first oil pump 10 and the second oil pump 11 by increasing the pressures on the suction sides of the first oil pump 10 and the second oil pump 11. Furthermore, by controlling the supply of the working oil from the third oil pump 30 to the suction sides of the first oil pump 10 and the second oil pump 11 such that the pressures on the suction sides of the first oil pump 10 and the second oil pump 11 become the predetermined second pressure TP2, an excessive increase of the driving load of the third oil pump 30 is suppressed, and thereby, it is possible to improve the total efficiency of the working-fluid supply system 100.

In addition, in a case in which, when the rotation speed of the engine 50 is low and the rotation speeds of the first oil pump 10 and the second oil pump 11 are also low, the required flow amount Qr of the working oil that is required by the automatic transmission 70 can be covered by the first oil pump 10 and the second oil pump 11 even though the required flow amount Qr is relatively high, a situation in which the degree of the negative pressure on the suction sides of the first oil pump 10 and the second oil pump 11 is increased and in which the cavitation is likely to be caused is established. However, by performing the second returning flow control in which the working oil that has been discharged from the third oil pump 30 is supplied to the suction sides of the first oil pump 10 and the second oil pump 11 as described above, it is possible to make it difficult for the cavitation to be caused.

In the above-described second returning flow control, the level of the second pressure TP2 is set with the intention of improving the total efficiency of the working-fluid supply system 100. Instead, the level of the second pressure TP2 may also be set with the intention of suppressing the generation of cavitation on the suction sides of the first oil pump 10 and the second oil pump 11, or the level of the second pressure TP2 may also be set at the level at which the driving load of the third oil pump 30, in other words, the output from the electric motor 60 is not increased excessively.

According to the above-described first embodiment, the advantages described below are afforded.

In the above-described working-fluid supply system 100, when the first switching valve 22 is switched such that the supply target of the working oil from the second oil pump 11 becomes the suction side of the first oil pump 10, the supply of the working oil from the second oil pump 11 to the suction side of the first oil pump 10 is controlled by the second switching control unit 47 and the second switching valve 25 such that the pressure on the suction side of the first oil pump 10 becomes the predetermined first pressure TP1.

As described above, by returning the working oil that has been discharged from the second oil pump 11 to the suction side of the first oil pump 10, the excessive reduction of the pressure on the suction side of the first oil pump 10 to the negative pressure is suppressed, and so, it is possible to make it difficult for the cavitation to be caused on the suction side of the first oil pump 10, and at the same time, it is possible to improve the pump efficiency of the first oil pump 10 by increasing the pressure on the suction side of the first oil pump 10. In addition, by controlling the supply of the working oil from the second oil pump 11 to the suction side of the first oil pump 10 such that the pressure on the suction side of the first oil pump 10 becomes the predetermined first pressure TP1, the excessive increase of the driving load of the second oil pump 11 is suppressed, and it is possible to improve the total efficiency of the working-fluid supply system 100.

Second Embodiment

Figure 8:
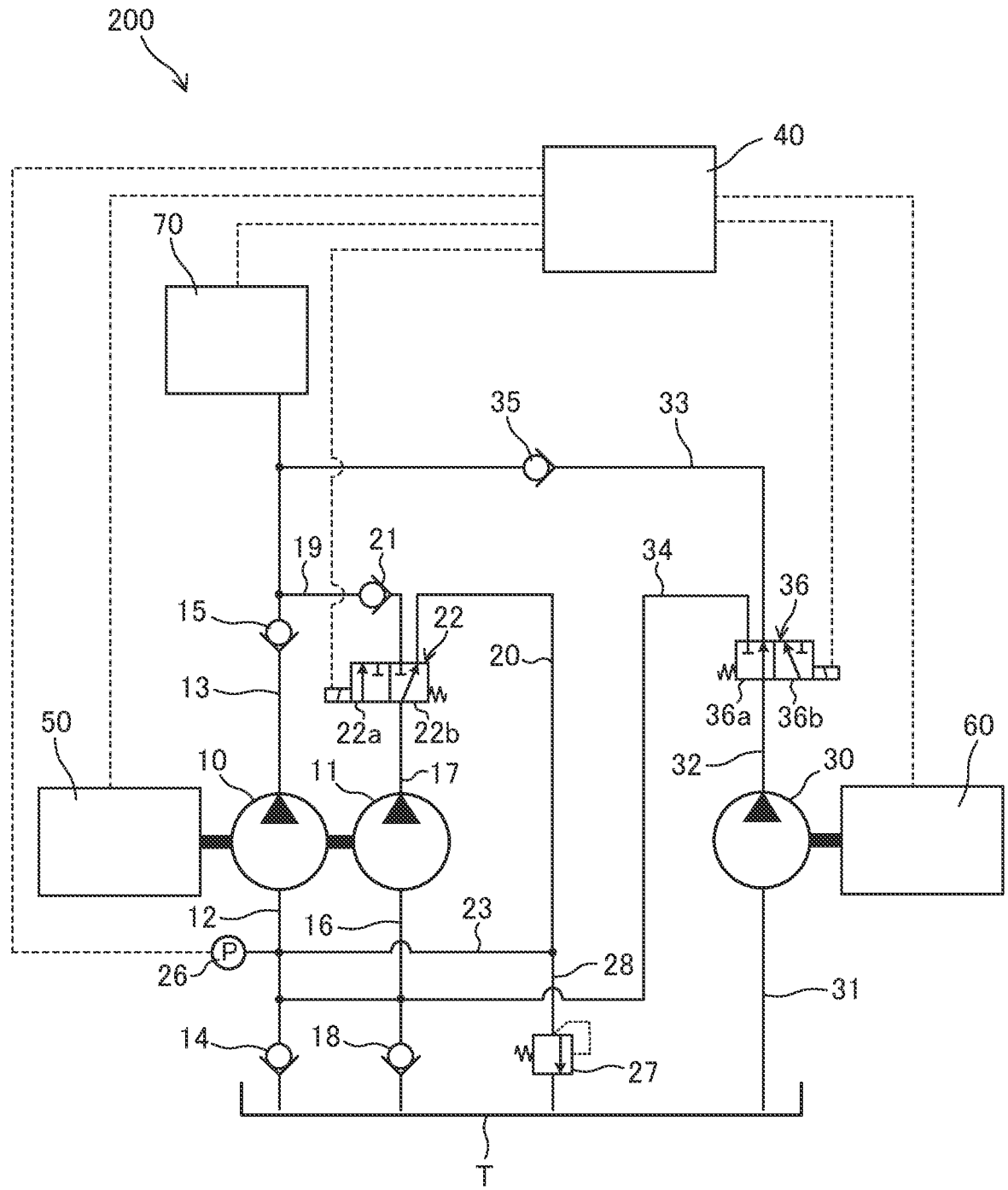
FIG. 8 is a schematic view showing a configuration of the working-fluid supply system according to a second embodiment of the present invention.

Next, a working-fluid supply system 200 according to a second embodiment of the present invention will be described with reference to FIG. 8. In the following, differences from the first embodiment will be mainly described, and components that are the same as those in the first embodiment are assigned the same reference numerals and descriptions thereof will be omitted.

Basic configurations of the working-fluid supply system 200 are the same as those of the working-fluid supply system 100 according to the first embodiment. The working-fluid supply system 200 differs from the working-fluid supply system 100 in that the second switching valve 25 is not provided, and a relief valve 27 is provided on a relief passage 28 that is branched from the first returning flow passage 20 and the second returning flow passage 23 serving as the returning flow passage that connects the first switching valve 22 with the suction side of the first oil pump 10. The relief passage 28 is connected to the tank T at a second end thereof.

The relief valve 27 is opened when the pressure on the upstream side, in other words, the pressure of the working oil flowing through the first returning flow passage 20 and the second returning flow passage 23 reaches a predetermined pressure such that the first returning flow passage 20 and the second returning flow passage 23 are communicated with the tank T. In other words, the pressure of the working oil flowing through the first returning flow passage 20 and the second returning flow passage 23 is not increased to exceed a predetermined pressure set at the relief valve 27.

Therefore, similarly to the working-fluid supply system 100 in the above-described first embodiment, in the working-fluid supply system 200, in a case in which the first returning flow control, in which the working oil that has been discharged from the second oil pump 11 is supplied to the suction side of the first oil pump 10, is performed, the pressure on the suction side of the first oil pump 10 to which the working oil is supplied through the first returning flow passage 20 and the second returning flow passage 23 is controlled by the relief valve 27 so as to be a predetermined pressure that is set at the relief valve 27.

Therefore, by setting a set pressure of the relief valve 27 at the first pressure TP1 shown in FIG. 4 for example, similarly to the working-fluid supply system 100 in the above-described first embodiment, it is possible to make it difficult for the cavitation to be caused on the suction side of the first oil pump 10 by suppressing the excessive reduction of the pressure on the suction side of the first oil pump 10 to the negative pressure, and at the same time, it is possible to improve the pump efficiency of the first oil pump 10 by increasing the pressure on the suction side of the first oil pump 10. Furthermore, by controlling the supply of the working oil from the second oil pump 11 to the suction side of the first oil pump 10 such that the pressure on the suction side of the first oil pump 10 becomes the predetermined first pressure TP1, an excessive increase of the driving load of the second oil pump 11 is suppressed, and thereby, it is possible to improve the total efficiency of the working-fluid supply system 200.

In addition, because the relief valve 27 has a compact configuration compared with the second switching valve 25 in the above-described first embodiment and a control thereof need not be performed, it is possible to reduce a production cost of the working-fluid supply system 200, and at the same time, it is possible to make the working-fluid supply system 200 compact.

As described above, in a case in which the working oil that has been discharged from the second oil pump 11 can be supplied to the suction side of the first oil pump 10, the relief valve 27 and the relief passage 28 on which the relief valve 27 is provided function as the first pressure control unit, and the first pressure control unit is operated such that the pressure on the suction side of the first oil pump 10 approaches the first pressure TP1 that is the target pressure.

It is preferable that the set pressure of the relief valve 27 be variable, and in such a case, the set pressure is appropriately changed, on the basis of the pump efficiency of the first oil pump 10 and the driving load of the second oil pump 11, to the first pressure TP1 that is set by the target pressure setting unit in the controller 40 as required or the first pressure TP1 that has been mapped and stored in the ROM of the controller 40 in advance. In addition, the level of the set pressure of the relief valve 27 is not limited to those set with the intention of improving the total efficiency of the working-fluid supply system 200, and the level may be set with the intention of suppressing the generation of cavitation in the suction side of the first oil pump 10 or the level may be set at the level at which the driving load of the second oil pump 11, which is substantially in the no-load operation state, is not increased excessively.

According to the above-described second embodiment, the advantages described below are afforded.

In the above-described working-fluid supply system 200, when the first switching valve 22 is switched such that the supply target of the working oil from the second oil pump 11 becomes the suction side of the first oil pump 10, the supply of the working oil from the second oil pump 11 to the suction side of the first oil pump 10 is controlled by the relief valve 27 such that the pressure on the suction side of the first oil pump 10 becomes the predetermined first pressure TP1.

As described above, by returning the working oil that has been discharged from the second oil pump 11 to the suction side of the first oil pump 10, the excessive reduction of the pressure on the suction side of the first oil pump 10 to the negative pressure is suppressed, and so, it is possible to make it difficult for the cavitation to be caused on the suction side of the first oil pump 10, and at the same time, it is possible to improve the pump efficiency of the first oil pump 10 by increasing the pressure on the suction side of the first oil pump 10. In addition, by controlling the supply of the working oil from the second oil pump 11 to the suction side of the first oil pump 10 such that the pressure on the suction side of the first oil pump 10 becomes the predetermined first pressure TP1, the excessive increase of the driving load of the second oil pump 11 is suppressed, and it is possible to improve the total efficiency of the working-fluid supply system 200.

Third Embodiment

Figure 9:
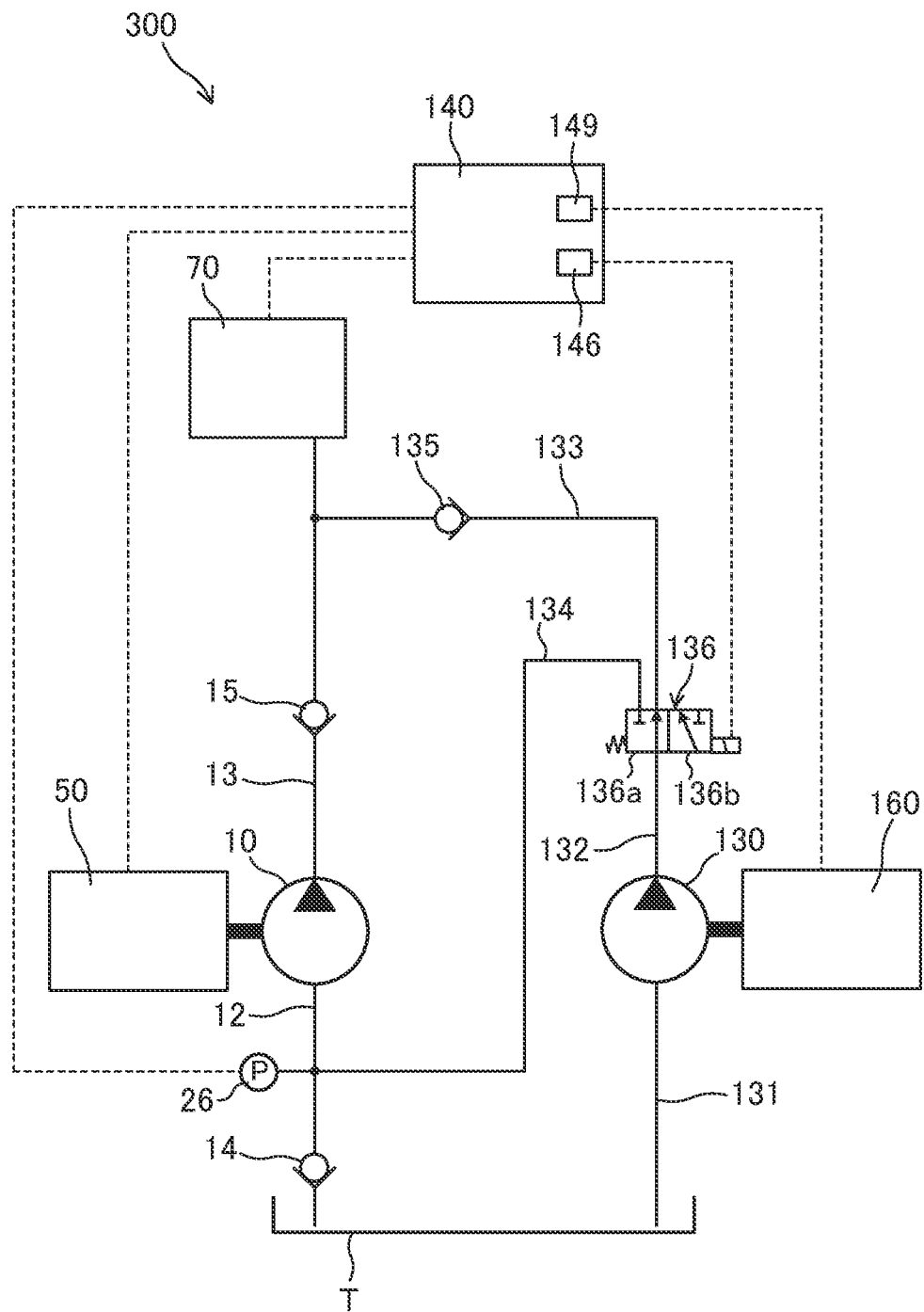
FIG. 9 is a schematic view showing a configuration of the working-fluid supply system according to a third embodiment of the present invention.

Next, a working-fluid supply system 300 according to a third embodiment of the present invention will be described with reference to FIG. 9. In the following, differences from the first embodiment will be mainly described, and components that are the same as those in the first embodiment are assigned the same reference numerals and descriptions thereof will be omitted.

Basic configurations of the working-fluid supply system 300 are the same as those of the working-fluid supply system 100 according to the first embodiment. The working-fluid supply system 300 differs from the working-fluid supply system 100 in that a second oil pump 130 serving as the second pump capable of supplying the working oil to the automatic transmission 70 is driven by an output from an electric motor 160 serving as the second driving source that is different from the engine 50 driving the first oil pump 10.

The working-fluid supply system 300 is provided with: the first oil pump 10 that is driven by the output from the engine 50 and that is capable of supplying the working oil serving as the working fluid to the automatic transmission 70; the second oil pump 130 serving as the second pump that is driven by the output from the electric motor 160 serving as the second driving source, which is different from the engine 50 driving the first oil pump 10, and that is capable of supplying the working oil to the automatic transmission 70; a first switching valve 136 that is capable of switching a supply target of the working oil from the second oil pump 130 to either one of the discharge side of the first oil pump 10 and the suction side of the first oil pump 10; and a controller 140 that controls the supply state of the working oil to the automatic transmission 70 by controlling the operation of the electric motor 160 and the first switching valve 136.

Similarly to the third oil pump 30 in the above-described first embodiment, the second oil pump 130 is the internal gear pump that is rotationally driven by the electric motor 160, and the second oil pump 130 sucks the working oil stored in the tank T through a suction pipe 131 and discharges the working oil through a second discharge pipe 132.

The second discharge pipe 132 is connected to the first discharge pipe 13 via the first switching valve 136 and a connecting pipe 133. The connecting pipe 133 is provided with a check valve 135 that allows only a flow of the working oil from the second oil pump 130 to the automatic transmission 70.

The first switching valve 136 is the electrically driven switching valve and has: two positions, i.e. a first position 136a at which the second discharge pipe 132 is communicated with the connecting pipe 133 and a second position 136b at which the second discharge pipe 132 is communicated with a returning flow passage 134. Although the position of the first switching valve 136 is controlled by the controller 140, it is biased so as to be set at the first position 136a when the electric current is not supplied.

A first end of the returning flow passage 134 is connected to the first switching valve 136 and a second end of the returning flow passage 134 is connected to the part of the first suction pipe 12 on the downstream side of the check valve 14 on the suction side of the first oil pump 10.

In a state in which the first switching valve 136 having the above-described configuration is switched to the first position 136a, the second discharge pipe 132 is communicated with the connecting pipe 133, and the communication between the second discharge pipe 132 and the returning flow passage 134 is shut off. Thus, the working oil that has been discharged from the second oil pump 130 is supplied to the automatic transmission 70 through the connecting pipe 133.

On the other hand, in a state in which the first switching valve 136 is switched to the second position 136b, the second discharge pipe 132 is communicated with the returning flow passage 134, and the communication between the second discharge pipe 132 and the connecting pipe 133 is shut off. Thus, the working oil that has been discharged from the second oil pump 130 is supplied to the suction side of the first oil pump 10 through the returning flow passage 134.

In other words, when the position of the first switching valve 136 is set at the second position 136b, a state in which the working oil that has been discharged from the second oil pump 130 is supplied to the suction side of the first oil pump 10 is established. Therefore, by suppressing the excessive reduction of the pressure on the suction side of the first oil pump 10 to the negative pressure, it is possible to make it difficult for the cavitation to be caused. In addition, by increasing the pressure on the suction side of the first oil pump 10, it is possible to improve the pump efficiency of the first oil pump 10.

The output from the electric motor 160 that rotationally drives the second oil pump 130 is controlled by the controller 140. Thus, it is possible to freely change the discharge flow amount from the second oil pump 130 by changing the output from the electric motor 160.

The position of the first switching valve 136 may be switched as the valve body (not shown) is directly driven by the solenoid (not shown) or may be switched by the presence/absence of the pilot pressure acting on the valve body, and as a driving system of the first switching valve 136, any system may be employed as long as the position is switched in accordance with an instruction from the controller 140.

The controller 140 has the similar configuration as that of the controller 40 in the above-described first embodiment. The controller 140 performs the supply control of the working oil to the automatic transmission 70, and in a case in which the second oil pump 130 is in a state in which the working oil is not supplied to the automatic transmission 70, the controller 140 performs the returning flow control in which the working oil that has been discharged from the second oil pump 130 is supplied to the suction side of the first oil pump 10.

In the returning flow control, similarly to the case in the above-described first embodiment, in order to improve the total efficiency of the working-fluid supply system 300, the first pressure control unit, which will be described below, controls the supply of the working oil from the second oil pump 130 such that the pressure on the suction side of the first oil pump 10 becomes the predetermined first pressure TP1. The first pressure TP1 is the pressure on the suction side of the first oil pump 10 at the time when the total efficiency of the working-fluid supply system 300 reaches the highest efficiency, the total efficiency being calculated at least on the basis of the pump efficiency of the first oil pump 10 and the driving load of the second oil pump 130.

Figure 10:
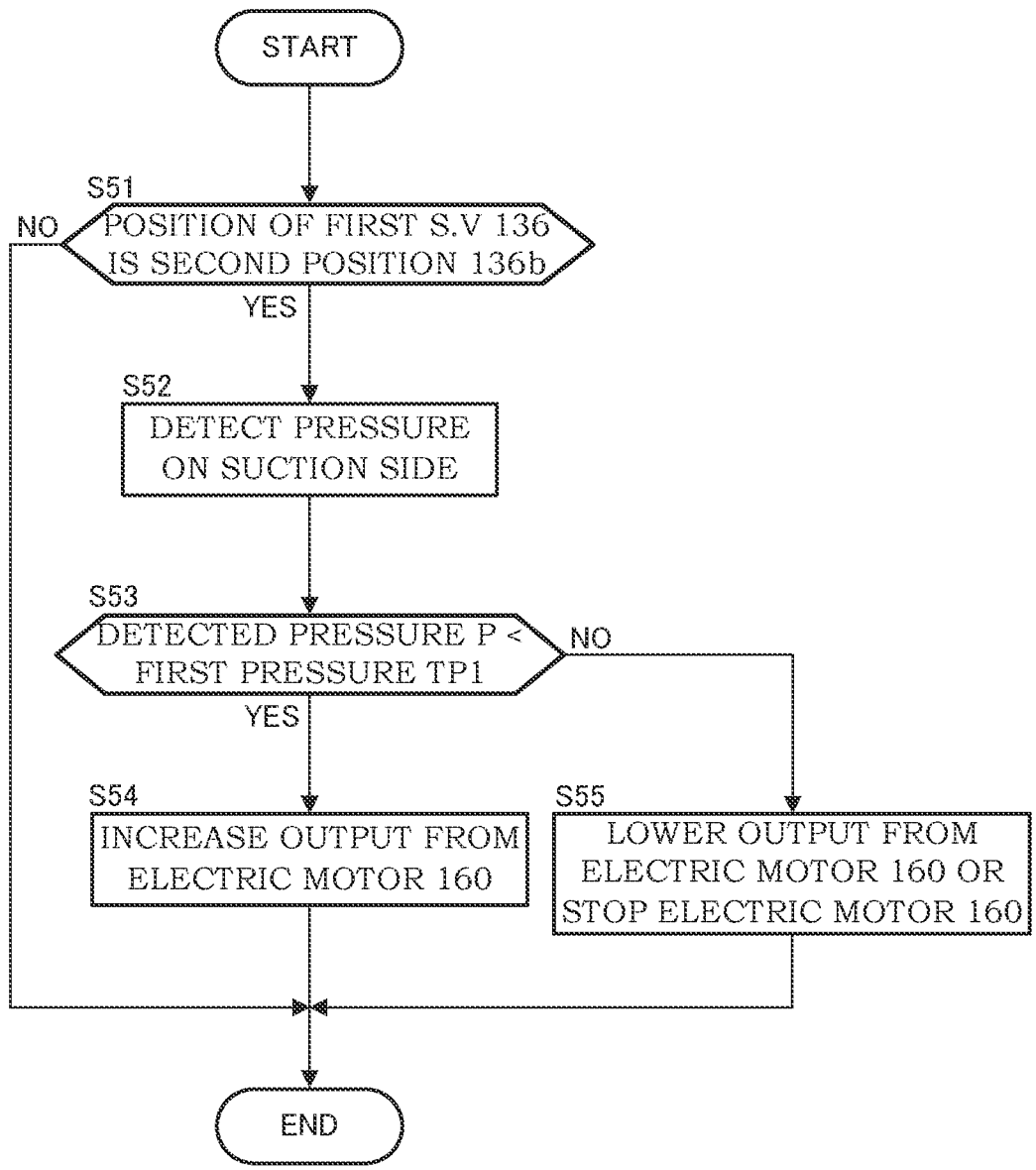
FIG. 10 is a diagram for describing a returning flow control executed by the controller of the working-fluid supply system according to the third embodiment of the present invention.

Next, the returning flow control will be described with reference to a flow chart in FIG. 10. The control shown in FIG. 10 is executed repeatedly at predetermined time intervals by the controller 140.

First of all, in step S51, the controller 140 determines whether or not the position of the first switching valve 136 is set at the second position 136b. In a case in which the second oil pump 130 is in a state in which the working oil is not supplied to the automatic transmission 70, in other words, in a case in which the required flow amount Qr of the working oil that is required by the automatic transmission 70 is relatively low, and the required flow amount Qr can be covered by driving the first oil pump 10 only, the first switching valve 136 is switched to the second position 136*b* by a first switching control unit 146. Thus, when it is determined that the required flow amount Qr can be covered by driving the first oil pump 10 only, the controller 140 determines that the position of the first switching valve 136 is set at the second position 136*b*. The determination of the position of the first switching valve 136 may also be performed on the basis of the detected value from the position sensor (not shown) capable of detecting the position of the first switching valve 136.

In step S51, when it is determined that the position of the first switching valve 136 is set at the second position 136*b*, the process proceeds to step S52, and the detection of the pressure on the suction side of the first oil pump 10 is performed. On the other hand, in step S51, when it is determined that the position of the first switching valve 136 is not set at the second position 136*b*, it is determined to be in a state in which the working oil that has been discharged from the second oil pump 130 cannot be supplied to the suction side of the first oil pump 10, and the process is terminated once.

In step S52, the detected pressure P detected by the pressure sensor 26 is obtained, and in following step S53, the comparison of the obtained detected pressure P with the first pressure TP1 that is the target pressure is performed. The first pressure TP1 is the pressure on the suction side of the first oil pump 10 at the time when the total efficiency of the working-fluid supply system 300 is estimated to be the highest efficiency, and the first pressure TP1 is set in advance by the target pressure setting unit in the controller 140 on the basis of the pump efficiency of the first oil pump 10 and the driving load of the second oil pump 130. The first pressure TP1 may be mapped and stored in the ROM of the controller 40 in advance.

In a case in which the detected pressure P is lower than the first pressure TP1, the process proceeds to step S54, and the output from the electric motor 160 is increased by an output control unit 149. By doing so, the flow amount of the working oil supplied from the second oil pump 130 to the suction side of the first oil pump 10 through the returning flow passage 134 is increased.

On the other hand, in a case in which the detected pressure P is equal to or higher than the first pressure TP1, the process proceeds to step S55, and the output from the electric motor 160 is reduced or the electric motor 160 is stopped by the output control unit 149. By doing so, the flow amount of the working oil supplied from the second oil pump 130 to the suction side of the first oil pump 10 through the returning flow passage 134 is reduced.

As described above, in a case in which the working oil that has been discharged from the second oil pump 130 can be supplied to the suction side of the first oil pump 10, the output control unit 149 that controls the output from the electric motor 160 functions as the first pressure control unit, and the first pressure control unit is operated such that the pressure on the suction side of the first oil pump 10 approaches the first pressure TP1 that is the target pressure.

As described above, by performing the returning flow control, it is possible to make it difficult for the cavitation to be caused on the suction side of the first oil pump 10 by suppressing the excessive reduction of the pressure on the suction side of the first oil pump 10 to the negative pressure, and at the same time, it is possible to improve the pump efficiency of the first oil pump 10 by increasing the pressure on the suction side of the first oil pump 10. Furthermore, by causing the pressure on the suction side of the first oil pump 10 to approach the first pressure TP1, it is possible to improve the total efficiency of the working-fluid supply system 300.

In addition, in a case in which, when the rotation speed of the engine 50 is low and the rotation speed of the first oil pump 10 is also low, the required flow amount Qr of the working oil that is required by the automatic transmission 70 can be covered by the first oil pump 10 only even though the required flow amount Qr is relatively high, a situation in which the degree of the negative pressure on the suction side of the first oil pump 10 is increased and in which the cavitation is likely to be caused is established. However, by performing the returning flow control in which the working oil that has been discharged from the second oil pump 130 is supplied to the suction side of the first oil pump 10 as described above, it is possible to make it difficult for the cavitation to be caused.

In the above-described returning flow control, the level of the first pressure TP1 is set with the intention of improving the total efficiency of the working-fluid supply system 300. Instead, the level of the first pressure TP1 may also be set with the intention of suppressing the generation of cavitation on the suction side of the first oil pump 10, or the level of the first pressure TP1 may also be set at the level at which the driving load of the second oil pump 130, in other words, the output from the electric motor 160 is not increased excessively.

According to the above-described third embodiment, the advantages described below are afforded.

In the above-described working-fluid supply system 300, when the first switching valve 136 is switched such that the supply target of the working oil from the second oil pump 130 becomes the suction side of the first oil pump 10, the supply of the working oil from the second oil pump 130 to the suction side of the first oil pump 10 is controlled by the output control unit 149 such that the pressure on the suction side of the first oil pump 10 becomes the predetermined first pressure TP1.

As described above, by supplying the working oil that has been discharged from the second oil pump 130 to the suction side of the first oil pump 10, the excessive reduction of the pressure on the suction side of the first oil pump 10 to the negative pressure is suppressed, and so, it is possible to make it difficult for the cavitation to be caused on the suction side of the first oil pump 10, and at the same time, it is possible to improve the pump efficiency of the first oil pump 10 by increasing the pressure on the suction side of the first oil pump 10. In addition, by controlling the supply of the working oil from the second oil pump 130 to the suction side of the first oil pump 10 such that the pressure on the suction side of the first oil pump 10 becomes the predetermined first pressure TP1, the excessive increase of the driving load of the second oil pump 130 is suppressed, and it is possible to improve the total efficiency of the working-fluid supply system 300.

Next, modifications of the respective embodiments described above will be described. The modifications described below also fall within the scope of the present invention, and it is also possible to combine the configurations shown in the modifications with the configurations described in the above respective embodiments, or to combine the configurations described in the following different modifications.

In the above-described first and second embodiments, the working oil that has been discharged from the second oil pump 11 is supplied to the suction side of the first oil pump 10 in the first returning flow control. Instead of this configuration, in a case in which not only the second oil pump 11, but also the third oil pump 30 are in a state in which the working oil is not supplied to the automatic transmission 70, specifically, in a case in which the supply state is set at the first supply state by the supply state setting unit 45, the working oil that has been discharged from the third oil pump 30 may be supplied to the suction side of the first oil pump 10 in the first returning flow control.

In this case, the output control unit 49 that controls the output from the electric motor 60 to change the discharged amount from the third oil pump 30 functions as the first pressure control unit, and the first pressure control unit is operated such that the pressure on the suction side of the first oil pump 10 approaches the first pressure TP1 that is the target pressure. In addition, in this case, the third oil pump 30 corresponds to the second pump, the third switching valve 36 corresponds to the first switching valve, and the third switching control unit 48 corresponds to the first switching control unit. The first pressure TP1 is the pressure on the suction side of the first oil pump 10 at the time when the total efficiency of the working-fluid supply system 100 reaches the highest efficiency, the total efficiency being calculated at least on the basis of the pump efficiency of the first oil pump 10 and the driving load of the third oil pump 30.

As described above, in the first returning flow control, although the pump for supplying the working oil to the suction side of the first oil pump 10 may be either of the second oil pump 11 and the third oil pump 30, it is preferable to select the pump that can better improve the total efficiency of the working-fluid supply system 100 when the first returning flow control is performed.

In a case in which not only the second oil pump 11, but also the third oil pump 30 are in a state in which the working oil is not supplied to the automatic transmission 70, in the first returning flow control, as the pump for supplying the working oil to the suction side of the first oil pump 10, two pumps, i.e. the second oil pump 11 and the third oil pump 30, may also be used. In this case, the two pumps, i.e. the second oil pump 11 and the third oil pump 30, correspond to the second pump, the two switching valves, i.e. the first switching valve 22 and the third switching valve 36, correspond to the first switching valve, and the two switching control units, i.e. the first switching control unit 46 and the third switching control unit 48, correspond to the first switching control unit.

In addition, in the above-described first and second embodiments, the second oil pump 11 is a vane pump of a fixed displacement type. Instead of this configuration, the second oil pump 11 may be a variable displacement vane pump or a piston pump, and in this case, when the first returning flow control, in which the working oil that has been discharged from the second oil pump 11 is supplied to the suction side of the first oil pump 10, is performed, the flow amount of the working oil to be supplied to the suction side of the first oil pump 10 may be controlled by changing the discharged amount from the second oil pump 11 by adjusting an amount of eccentricity of a cam ring or a stroke of a piston. In this case, in the above-described first embodiment, it is possible to omit the second switching valve 25 and the branch passage 24, and in the above-described second embodiment, it is possible to omit the relief valve 27 and the relief passage 28.

In addition, in the above-described first and second embodiments, the first switching valve 22 is configured of a single valve device having two positions, i.e. the first position 22a at which the second discharge pipe 17 is communicated with the first connecting pipe 19 and the second position 22b at which the second discharge pipe 17 is communicated with the first returning flow passage 20. Instead of this configuration, the first switching valve 22 may be configured of two open/close valves, i.e. an open/close valve that allows communication or shut off between the second discharge pipe 17 and the first connecting pipe 19 and an open/close valve that allows communication or shut off between the second discharge pipe 17 and the first returning flow passage 20. Similarly, the third switching valve 36 may also be configured of two open/close valves. In addition, the second switching valve 25 in the above-described first embodiment and the first switching valve 136 in the above-described third embodiment may also be configured of two open/close valves.

In addition, in the above-described first embodiment, the second switching valve 25 is provided separately from the first switching valve 22. Instead of this configuration, the second switching valve 25 may be configured integrally with the first switching valve 22 so as to be a single valve device having three positions, i.e. a first position at which the second discharge pipe 17 is communicated with the first connecting pipe 19, a second position at which the second discharge pipe 17 is communicated with the second returning flow passage 23, and a third position at which the second discharge pipe 17 is communicated with the branch passage 24.

In addition, in the above-described first and second embodiments, the third oil pump 30 is provided in addition to the first oil pump 10 and the second oil pump 11. In a case in which the required flow amount Qr of the working oil that is required by the automatic transmission 70 that is the fluid apparatus can be sufficiently covered by the two pumps, i.e. the first oil pump 10 and the second oil pump 11, the third oil pump 30 may not be provided.

In addition, in the above-described first and second embodiments, the change in the driving load of the second oil pump 11 is estimated from the detected pressure P detected by the pressure sensor 26. Instead of this configuration, a torque of the driving shaft of the second oil pump 11 may be detected directly.

In addition, in the respective embodiments described above, although the working oil is used as the working fluid, a non-compressive fluid such as water, aqueous solution, and so forth may also be used instead of the working oil.

In addition, although a case in which the automatic transmission 70 is a transmission provided with the belt type continuously variable transmission (CVT) has been described in the respective embodiments described above, the automatic transmission 70 may be of any type as long as it is operated by utilizing the pressure of the working oil, and the automatic transmission 70 may be provided with the toroidal continuously variable transmission or the planetary gear mechanism.

In addition, although the working-fluid supply systems 100, 200, and 300 have been described as those for supplying the working fluid to the motive force transmitting device of the vehicle in the respective embodiments described above, the applications of the working-fluid supply systems 100, 200, and 300 of the present invention are not limited to the vehicles, and the working-fluid supply systems 100, 200, and 300 may also be applied to, for example, construction work equipment, ships, aircraft, and stationary equipment as long as they are provided with a fluid apparatus operated by the working fluid supplied by a pump.

In addition, in the respective embodiments described above, the first oil pump 10 and the second oil pump 11 are the vane pumps, and the third oil pump 30 is the internal gear pump. The types of these pumps may not necessarily be different, and those of the same type may be used, and for example, all of them may be the vane pumps. In addition, the types of the pumps are not limited thereto, and for example, they may also be external gear pumps and piston pumps.

In addition, in the respective embodiments described above, the first oil pump 10 is driven by the output from the engine 50. The first driving source driving the first oil pump 10 is not limited to the engine 50, and for example, the first driving source may be an electric motor driving the driving wheel of the vehicle.

In addition, in the above-described first and second embodiments, the third oil pump 30 is driven by the output from the electric motor 60. The second driving source driving the third oil pump 30 is not limited to the electric motor 60, and for example, the second driving source may be an auxiliary engine that drives an auxiliary device, etc. Similarly, the second driving source that drives the second oil pump 130 in in the above-described third embodiment is not limited to the electric motor 60.

In addition, in the respective embodiments described above, although the various signals are listed as the signals indicating the state of the vehicle to be input to the controller 40, 140, in a case in which the torque converter is provided in the automatic transmission 170, for example, the signals indicating the operated state and the engaged state of the torque converter may be input to the controller 40, 140 additionally. In this case, the required flow amount Qr of the automatic transmission 70 may be computed or the switching of the supply state of the working oil to the automatic transmission 70 may be limited by taking the state of the torque converter into consideration. For example, when it is detected that the torque converter is in a semi-engaged state (a slip lock up state), the shifting of the working oil the supply state to other supply state may be prohibited. By doing so, it is possible to maintain the torque converter in a stable operated state. In addition, the signals indicating the operated amount and the operated speed of the brake may be input to the controller 40, 140 as the signals indicating the deceleration state of the vehicle.

In addition, in the above-described first and second embodiments, in the discharge flow amount calculating unit 42 of the controller 40, the first discharge flow amount Q1 of the working oil discharged from the first oil pump 10 and the second discharge flow amount Q2 of the working oil discharged from the second oil pump 11 are calculated. Instead of this configuration, the actual discharge flow amount of the working oil discharged from the first oil pump 10 and the second oil pump 11 may be measured by a flow amount sensor, etc. directly. The same applies to the first discharge flow amount Q1 of the working oil discharged from the first oil pump 10 in the above-described third embodiment.

The configurations, operations, and effects of the embodiments of the present invention will be collectively described below.

The working-fluid supply system 100, 200, 300 is provided with: the first pump 10 configured to be driven by the output from the engine 50, the first pump 10 being capable of supplying the working oil to the automatic transmission 70; the second pump 11, 30, 130 configured to be driven by the output from the engine 50 or the electric motor 60, 160, the second pump 11, 30, 130 being capable of supplying the working oil to the automatic transmission 70; the first switching valve 22, 36, 136 capable of switching the supply target of the working oil from the second pump 11, 30, 130 to either one of the discharge side of the first pump 10 and the suction side of the first pump 10; the first switching control unit 46, 146 configured to switch the first switching valve 22, 36, 136 such that the supply target of the working oil from the second pump 11, 30, 130 becomes the suction side of the first pump 10 in a case in which the first discharge flow amount of the working oil discharged from the first pump 10 is equal to or higher than the required flow amount of the working oil required by the automatic transmission 70, and the first switching control unit 46, 146 being configured to switch the first switching valve 22, 36, 136 such that the supply target of the working oil from the second pump 11, 30, 130 becomes the discharge side of the first pump 10 in a case in which the first discharge flow amount is lower than the required flow amount; and the first pressure control unit 25, 47, 27, 28, 49, 149 that performs the control such that the pressure on the suction side of the first pump 10 becomes the predetermined first pressure TP1 when the first switching valve 22, 36, 136 is switched such that the supply target of the working oil from the second pump 11, 30, 130 becomes the suction side of the first pump 10.

With this configuration, when the first switching valve 22, 36, 136 is switched such that the supply target of the working oil from the second pump 11, 30, 130 becomes the suction side of the first pump 10, the supply of the working oil from the second pump 11, 30, 130 to the suction side of the first pump 10 is controlled by the first pressure control unit 25, 47, 27, 28, 49, 149 such that the pressure on the suction side of the first pump 10 becomes the predetermined first pressure TP1.

As described above, by supplying the working oil that has been discharged from the second pump 11, 30, 130 to the suction side of the first pump 10, it is possible to make it difficult for the cavitation to be caused on the suction side of the first pump 10 by suppressing the excessive reduction of the pressure on the suction side of the first pump 10 to the negative pressure, and at the same time, by increasing the pressure on the suction side of the first pump 10, it is possible to improve the pump efficiency of the first pump 10. In addition, by controlling the supply of the working oil from the second pump 11, 30, 130 to the suction side of the first pump 10 such that the pressure on the suction side of the first pump 10 becomes the predetermined first pressure TP1, the excessive increase of the driving load of the second pump 11, 30, 130 is suppressed, and thereby, it is possible to improve the total efficiency of the working-fluid supply system 100, 200, 300.

In addition, the second pump 11 is driven by the output from the engine 50, and the first pressure control unit has: the second switching valve 25 provided on the returning flow passage 20, 23 connecting the first switching valve 22 with the suction side of the first pump 10, the second switching valve 25 being capable of switching the supply target of the working oil from the second pump 11 to either one of the suction side of the first pump 10 and the tank T in which the working oil is stored; and the second switching control unit 47 configured to switch the second switching valve 25 such that the supply target of the working oil from the second pump 11 becomes the suction side of the first pump 10 in a case in which the pressure on the suction side of the first pump 10 is equal to or lower than the first pressure TP1, the second switching control unit 47 being configured to switch the second switching valve 25 such that the supply target of the working oil from the second pump 11 becomes the tank T in a case in which the pressure on the suction side of the first pump 10 is higher than the first pressure TP1.

With this configuration, when the first switching valve 22 is switched such that the supply target of the working oil from the second pump 11 becomes the suction side of the first pump 10, the supply of the working oil from the second pump 11 to the suction side of the first pump 10 is controlled by the second switching valve 25 and the second switching control unit 47 such that the pressure on the suction side of the first pump 10 becomes the predetermined first pressure TP1.

As described above, by returning the working oil that has been discharged from the second pump 11 to the suction side of the first pump 10, it is possible to make it difficult for the cavitation to be caused on the suction side of the first pump 10 by suppressing the excessive reduction of the pressure on the suction side of the first pump 10 to the negative pressure, and at the same time, by increasing the pressure on the suction side of the first pump 10, it is possible to improve the pump efficiency of the first pump 10. In addition, by controlling the supply of the working oil from the second pump 11 to the suction side of the first pump 10 such that the pressure on the suction side of the first pump 10 becomes the predetermined first pressure TP1, the excessive increase of the driving load of the second pump 11 is suppressed, and thereby, it is possible to improve the total efficiency of the working-fluid supply system 100.

In addition, the second pump 11 is driven by the output from the engine 50, and the first pressure control unit has: the relief passage 28 branched from the returning flow passage 20, 23 and connected to the tank T, the returning flow passage 20, 23 being configured to connect the first switching valve 22 with the suction side of the first pump 10, and the tank T being configured to store the working oil; and the relief valve 27 provided on the relief passage 28, the relief valve 27 being configured to be opened when the pressure of the returning flow passage 20, 23 is larger than the first pressure TP1 such that the returning flow passage 20, 23 is communicated with the tank T.

With this configuration, when the first switching valve 22 is switched such that the supply target of the working oil from the second pump 11 becomes the suction side of the first pump 10, the supply of the working oil from the second pump 11 to the suction side of the first pump 10 is controlled by the relief valve 27 and the relief passage 28 such that the pressure on the suction side of the first pump 10 becomes the predetermined first pressure TP1.

As described above, by returning the working oil that has been discharged from the second pump 11 to the suction side of the first pump 10, it is possible to make it difficult for the cavitation to be caused on the suction side of the first pump 10 by suppressing the excessive reduction of the pressure on the suction side of the first pump 10 to the negative pressure, and at the same time, by increasing the pressure on the suction side of the first pump 10, it is possible to improve the pump efficiency of the first pump 10. In addition, by controlling the supply of the working oil from the second pump 11 to the suction side of the first pump 10 such that the pressure on the suction side of the first pump 10 becomes the predetermined first pressure TP1, the excessive increase of the driving load of the second pump 11 is suppressed, and thereby, it is possible to improve the total efficiency of the working-fluid supply system 200.

In addition, the second pump 11 is driven by the output from the engine 50, and the working-fluid supply system 100, 200 is further provided with: the third pump 30 driven by the output from the electric motor 60, the third pump 30 being capable of supplying the working oil to the automatic transmission 70; the third switching valve 36 capable of switching the supply target of the working oil from the third pump 30 to either one of the discharge side of the first pump 10 and the suction sides of the first pump 10 and the second pump 11; the third switching control unit 48 configured to switch the third switching valve 36 such that the supply target of the working oil from the third pump 30 becomes the suction sides of the first pump 10 and the second pump 11 in a case in which the first discharge flow amount is lower than the required flow amount, and the total flow amount of the first discharge flow amount and the second discharge flow amount of the working oil discharged from the second pump 11 is equal to or higher than required flow amount, and the third switching control unit 48 being configured to switch the third switching valve 36 such that the supply target of the working oil from the third pump 30 becomes the discharge side of the first pump 10 in a case in which the total flow amount is lower than the required flow amount; and the output control unit 49 configured to perform the control such that the pressures on the suction sides of the first pump 10 and the second pump 11 become the predetermined second pressure TP2 when the third switching valve 36 is switched such that the supply target of the working oil from the third pump 30 becomes the suction sides of the first pump 10 and the second pump 11.

With this configuration, the supply of the working oil from the third pump 30 to the suction sides of the first pump 10 and the second pump 11 is controlled by the output control unit 49 such that the pressure on the suction side of the first pump 10 becomes the predetermined second pressure TP2 when the third switching valve 36 is switched such that the supply target of the working oil from the third pump 30 becomes the suction sides of the first pump 10 and the second pump 11.

As described above, by supplying the working oil that has been discharged from the third pump 30 to the suction sides of the first pump 10 and the second pump 11, the excessive reduction of the pressure on the suction sides of the first pump 10 and the second pump 11 to the negative pressure is suppressed, and thereby, it is possible to make it difficult for the cavitation to be caused on the suction sides of the first pump 10 and the second pump 11, and at the same time, by increasing the pressure on the suction sides of the first pump 10 and the second pump 11, it is possible to improve the pump efficiencies of the first pump 10 and the second pump 11. In addition, by controlling the supply of the working oil from the third pump 30 to the suction sides of the first pump 10 and the second pump 11 such that the pressure on the suction sides of the first pump 10 and the second pump 11 become the predetermined second pressure TP2, the excessive increase of the driving load of the third pump 30 is suppressed, and thereby, it is possible to improve the total efficiency of the working-fluid supply system 100, 200.

In addition, the second pump 30, 130 is driven by the output from the electric motor 60, 160, and the first pressure control unit has the output control unit 49, 149 configured to increase the output from the electric motor 60, 160 in a case in which the pressure on the suction side of the first pump 10 is equal to or lower than the first pressure TP1, the output control unit 49, 149 being configured to reduce the output from the electric motor 60, 160 in a case in which the pressure on the suction side of the first pump 10 is higher than the first pressure TP1.

With this configuration, when the first switching valve 36, 136 is switched such that the supply target of the working oil from the second pump 30, 130 becomes the suction side of the first pump 10, the supply of the working oil from the second pump 30, 130 to the suction side of the first pump 10 is controlled by the output control unit 49, 149 such that the pressure on the suction side of the first pump 10 becomes the predetermined first pressure TP1.

As described above, by supplying the working oil that has been discharged from the second pump 30, 130 to the suction side of the first pump 10, it is possible to make it difficult for the cavitation to be caused on the suction side of the first pump 10 by suppressing the excessive reduction of the pressure on the suction side of the first pump 10 to the negative pressure, and at the same time, by increasing the pressure on the suction side of the first pump 10, it is possible to improve the pump efficiency of the first pump 10. In addition, by controlling the supply of the working oil from the second pump 30, 130 to the suction side of the first pump 10 such that the pressure on the suction side of the first pump 10 becomes the predetermined first pressure TP1, the excessive increase of the driving load of the second pump 30, 130 is suppressed, and thereby, it is possible to improve the total efficiency of the working-fluid supply system 100, 200, 300.

Embodiments of the present invention were described above, but the above embodiments are merely examples of applications of the present invention, and the technical scope of the present invention is not limited to the specific constitutions of the above embodiments.

This application claims priority based on Japanese Patent Application No. 2019-203015 filed with the Japan Patent Office on Nov. 8, 2019, the entire contents of which are incorporated into this specification by reference.

The invention claimed is:

1. A working-fluid supply system configured to supply working fluid to a fluid apparatus, the working-fluid supply system comprising:
 a first pump configured to be driven by output from a first driving source, the first pump being capable of supplying the working fluid to the fluid apparatus;
 a second pump configured to be driven by output from a second driving source different from the first driving source, the second pump being capable of supplying the working fluid to the fluid apparatus, the second driving source being an electric motor;
 a switching valve capable of switching a supply target of the working fluid from the second pump to either one of a discharge side of the first pump and a suction side of the first pump; and
 a control unit controller having a processor and a storage medium containing program instructions stored therein, execution of which by the processor causes the working-fluid supply system to provide the functions of
  controlling the switching valve to switch the supply target between the discharge side of the first pump or the suction side of the first pump in accordance with a required flow amount of the working fluid required by the fluid apparatus, and
  controlling a pressure on the suction side of the first pump to be a predetermined pressure by increasing the output from the electric motor in a case in which the pressure on the suction side of the first pump is equal to or lower than the predetermined pressure, and reducing the output from the electric motor in a case in which the pressure on the suction side of the first pump is higher than the predetermined pressure in response to the switching valve switching the supply target to the suction side of the first pump.

2. A working-fluid supply system configured to supply working fluid to a fluid apparatus, the working-fluid supply system comprising:
 a first pump configured to be driven by output from a first driving source, the first pump being capable of supplying the working fluid to the fluid apparatus;
 a second pump configured to be driven by output from a second driving source different from the first driving source, the second pump being capable of supplying the working fluid to the fluid apparatus;
 a switching valve capable of switching a supply target of the working fluid from the second pump to either one of a discharge side of the first pump and a suction side of the first pump;
 a switching control unit configured to switch the supply target of the switching valve in accordance with a required flow amount of the working fluid required by the fluid apparatus; and
 a pressure control unit configured to control the output from the second driving source such that pressure on the suction side of the first pump becomes a predetermined pressure when the switching valve switches the supply target of the working fluid from the second pump to the suction side of the first pump, wherein
the second driving source is an electric motor, and
the pressure control unit is configured to increase the output from the electric motor in a case in which the pressure on the suction side of the first pump is equal to or lower than the predetermined pressure and is configured to reduce the output from the electric motor in a case in which the pressure on the suction side of the first pump is higher than the predetermined pressure.

\* \* \* \* \*